US011219049B2

(12) United States Patent
Wang et al.

(10) Patent No.: US 11,219,049 B2
(45) Date of Patent: Jan. 4, 2022

(54) METHOD AND APPARATUS FOR TRANSMITTING AND RECEIVING SIGNAL IN MOBILE COMMUNICATION SYSTEM

(71) Applicant: Samsung Electronics Co., Ltd., Gyeonggi-do (KR)

(72) Inventors: Yi Wang, Beijing (CN); Yingyang Li, Beijing (CN); Shichang Zhang, Beijing (CN)

(73) Assignee: Samsung Electronics Co., Ltd

( * ) Notice: Subject to any disclaimer, the term of this patent is extended or adjusted under 35 U.S.C. 154(b) by 111 days.

(21) Appl. No.: 16/611,115

(22) PCT Filed: Apr. 25, 2018

(86) PCT No.: PCT/KR2018/004801

§ 371 (c)(1),
(2) Date: Nov. 5, 2019

(87) PCT Pub. No.: WO2018/203612

PCT Pub. Date: Nov. 8, 2018

(65) Prior Publication Data

US 2020/0084789 A1 Mar. 12, 2020

(30) Foreign Application Priority Data

May 5, 2017 (CN) ......................... 201710316545.7
Sep. 11, 2017 (CN) ......................... 201710816832.4

(51) Int. Cl.
*H04W 72/12* (2009.01)
*H04L 1/18* (2006.01)
*H04L 5/00* (2006.01)

(52) U.S. Cl.
CPC ....... *H04W 72/1273* (2013.01); *H04L 1/1812* (2013.01); *H04L 5/0055* (2013.01)

(58) Field of Classification Search
CPC ........... H04W 72/1273; H04W 72/042; H04W 88/02; H04L 1/1812; H04L 5/0055;
(Continued)

(56) References Cited

U.S. PATENT DOCUMENTS 10,721,046 B2 * 7/2020 Yang ......................... H04L 5/00
2013/0184023 A1 7/2013 Asokan et al.
(Continued)

FOREIGN PATENT DOCUMENTS

EP 3 567 773 11/2019
IN 201917029303 10/2019
(Continued)

OTHER PUBLICATIONS

PCT/ISA/210 Search Report issued on PCT/KR2018/004801, pp. 3.
(Continued)

*Primary Examiner* — Hanh N Nguyen
(74) *Attorney, Agent, or Firm* — The Farrell Law Firm, P.C.

(57) ABSTRACT

A method performed at a network node for scheduling DL transmissions and a corresponding network node is disclosed. The method includes determining, based on a number of TBs (TBs) scheduled in a DL transmission to be transmitted and a maximum number of CBGs dividable in the DL transmission, a maximum number of CBGs dividable in each TB of the DL transmission; determining a CBG configuration of CBGs scheduled in a corresponding TB based on a maximum number of CBGs dividable in each TB of the DL transmission; and transmitting DL control signaling indicating the CBG configuration. In addition, a method performed at a UE for feedback HARQ-ACK, and a corresponding UE, and a communication system including the network node and UE is also disclosed.

16 Claims, 11 Drawing Sheets

200

RECEIVE DOWNLINK CONTROL SIGNALING — S210

GENERATE AN HARQ-ACK CODEBOOK ACCORDING TO THE DOWNLINK CONTROL SIGNALING, A REFERENCE TRANSPORT BLOCK IN A DOWNLINK TRANSMISSION CORRESPONDING TO THE DOWNLINK CONTROL SIGNALING, AND A DECODING RESULT FOR THE DOWNLINK TRANSMISSION — S220

FEED A HARQ-ACK CORRESPONDING TO THE DOWNLINK TRANSMISSION BACK ACCORDING TO THE GENERATED HARQACK CODEBOOK — S230

(58) Field of Classification Search

CPC ... H04L 1/1896; H04L 1/1614; H04L 1/1825; H04L 1/1835; H04L 1/1861; H04L 1/0061; H04L 1/0057; H04L 1/1809; H04L 1/0047; H04L 5/00; H04L 1/1887; H04L 1/1621; H04L 1/0643

See application file for complete search history.

(56) References Cited

U.S. PATENT DOCUMENTS

| | | | | |
|---|---|---|---|---|
| 2013/0301586 | A1* | 11/2013 | Fan | H04L 1/1607 370/329 |
| 2016/0036578 | A1 | 2/2016 | Malladi et al. | |
| 2016/0226643 | A1 | 8/2016 | Mallik et al. | |
| 2016/0261392 | A1 | 9/2016 | Nammi et al. | |
| 2018/0287744 | A1* | 10/2018 | Sundararajan | H04L 1/1819 |
| 2018/0287752 | A1* | 10/2018 | Park | H04L 5/0053 |
| 2019/0132087 | A1* | 5/2019 | Wu | H04L 5/0055 |
| 2019/0356430 | A1* | 11/2019 | Cheng | H04L 1/1614 |
| 2021/0136695 | A1* | 5/2021 | Liu | H04W 76/27 |

FOREIGN PATENT DOCUMENTS

| | | |
|---|---|---|
| RU | 2015-115897 | 11/2016 |
| WO | WO 2016/006891 | 1/2016 |
| WO | WO 2016/126653 | 8/2016 |
| WO | WO 2016123372 | 8/2016 |

OTHER PUBLICATIONS

PCT/ISA/237 Written Opinion issued on PCT/KR2018/004801, pp. 9.

RU Decision on Grant dated Feb. 17, 2021 issued in counterpart application No. 2019139378/07, 17 pages.

Ericsson, "On Protocol Impacts of Code Block Group Based HARQ-ACK Feedback", R1-1706049, 3GPP TSG-RAN WG1 Meeting #88bis, Apr. 3-7, 2017, 3 pages.

European Search Report dated Apr. 17, 2020 issued in counterpart application No. 18793969.9-1205, 9 pages.

MediaTek Inc., "On eMBB/URLLC DL Multiplexing Indication", R1-1704474, 3GPP TSG RAN WG1 Meeting #88bis, Apr. 3-7, 2017, 5 pages.

Indian Examination Report dated Aug. 17, 2021 issued in counterpart application No. 201937048532, 6 pages.

* cited by examiner

[Fig. 1]
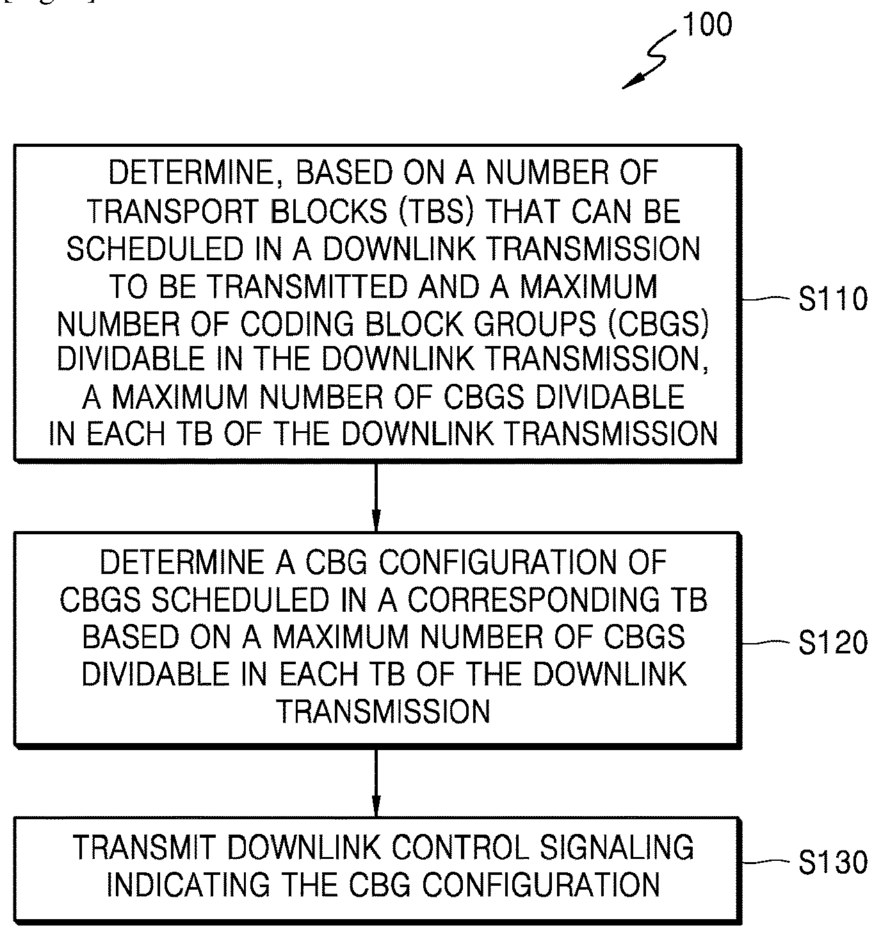
[Fig. 2]
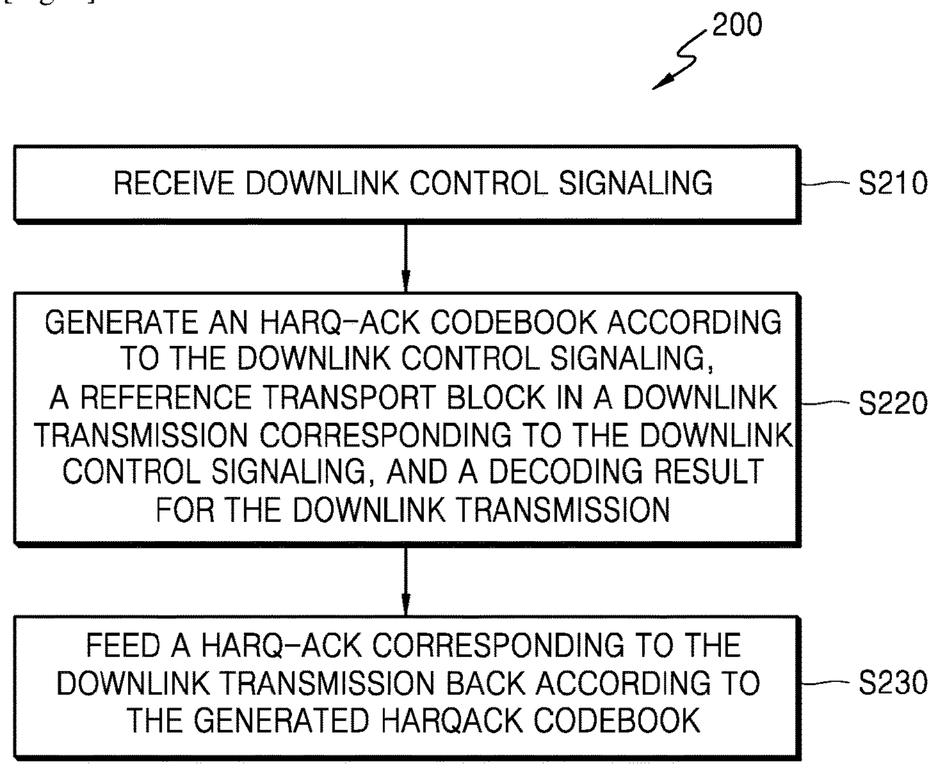

[Fig. 3]
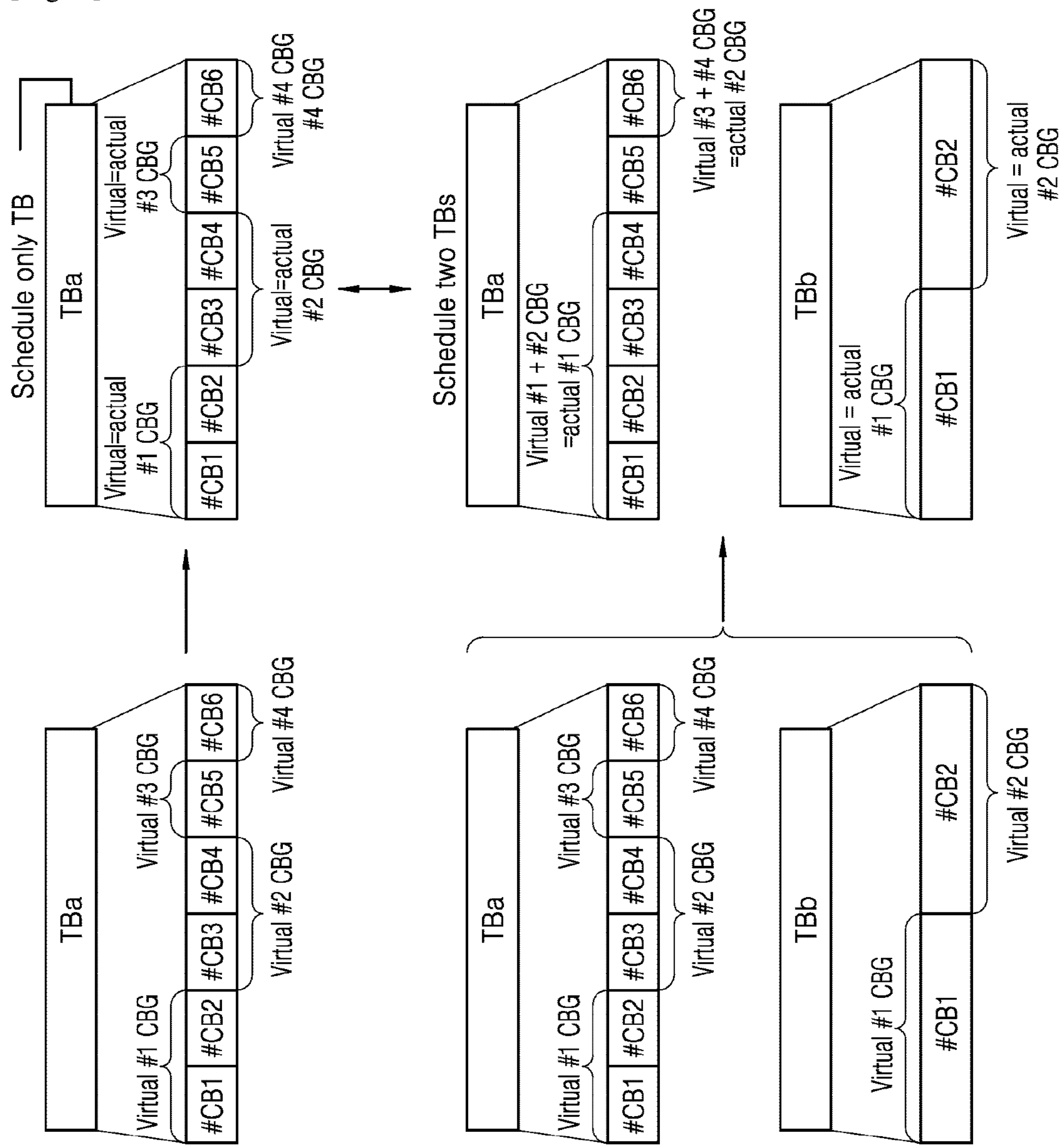

[Fig. 4]
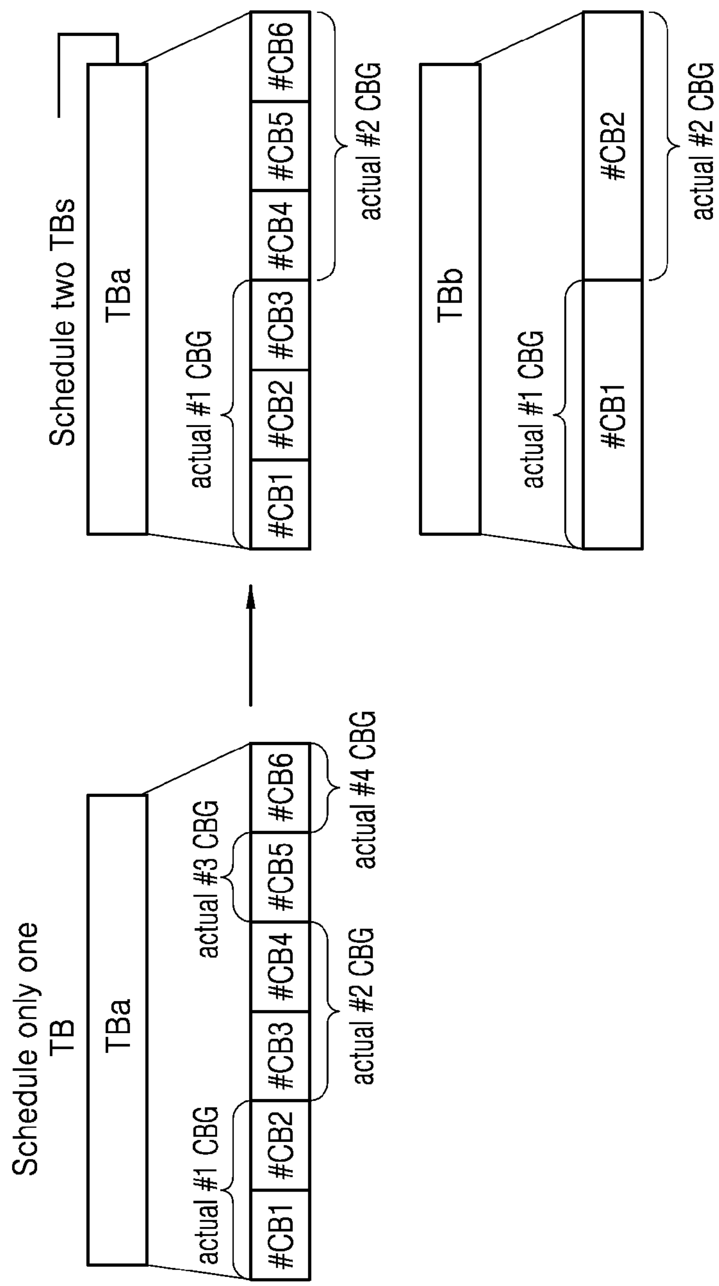

[Fig. 5]
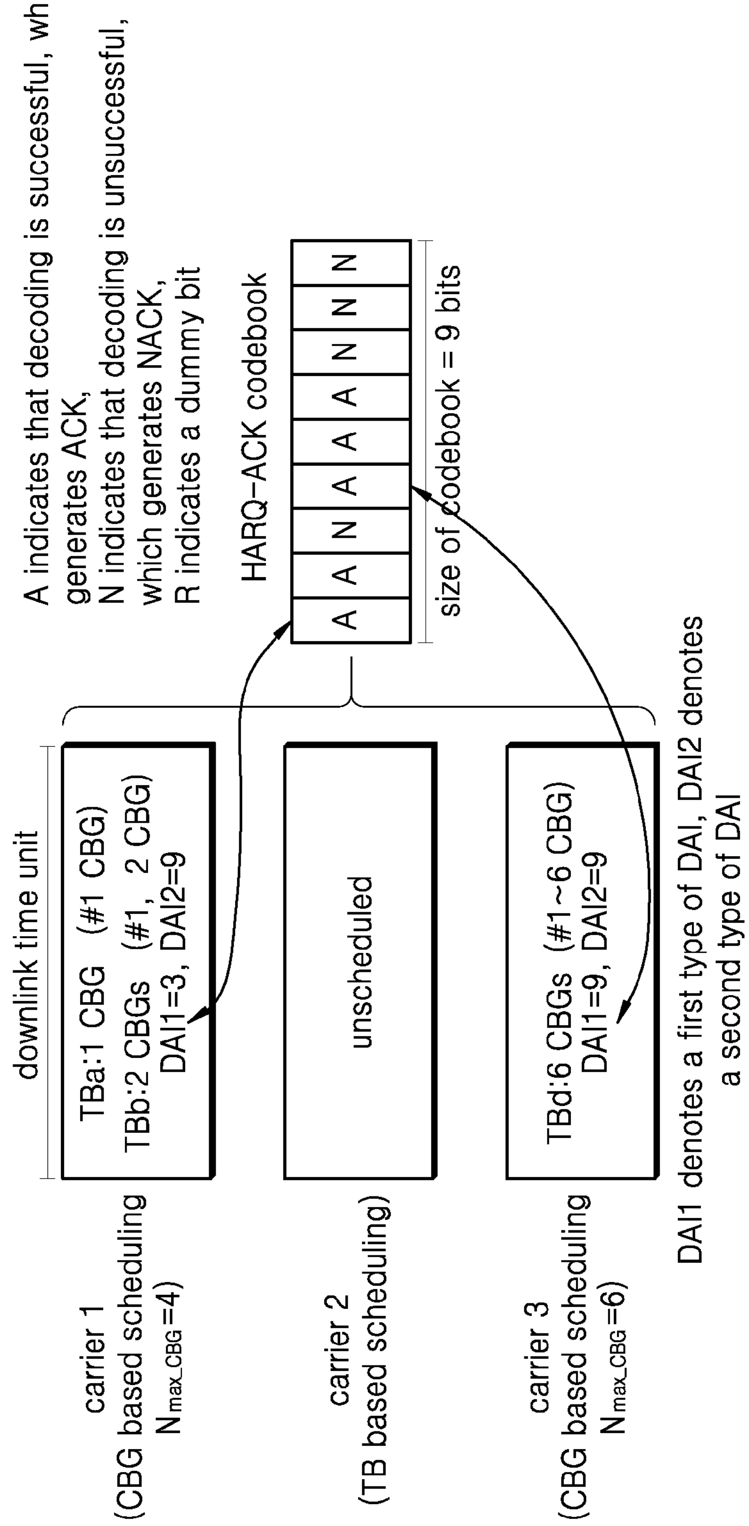

[Fig. 6]
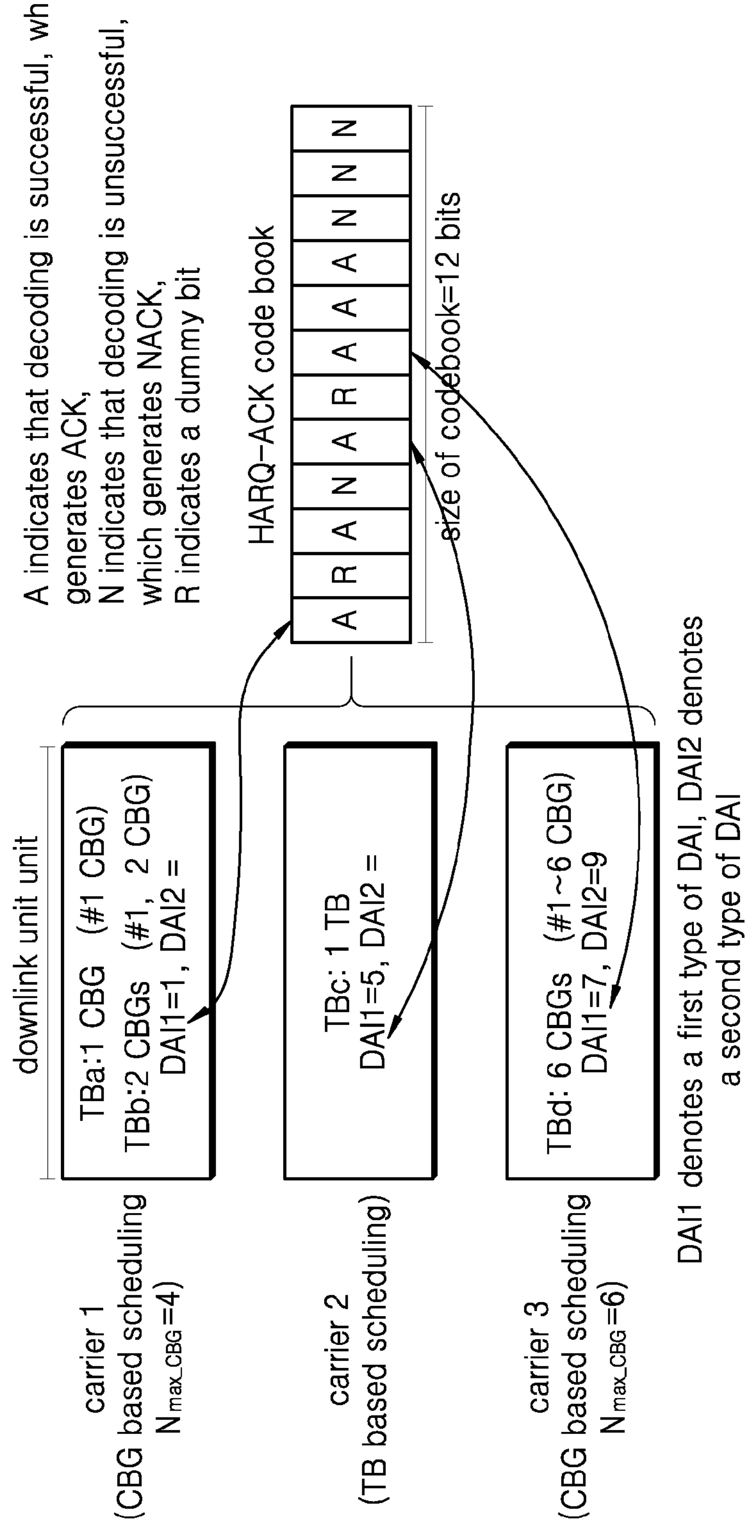

[Fig. 7]
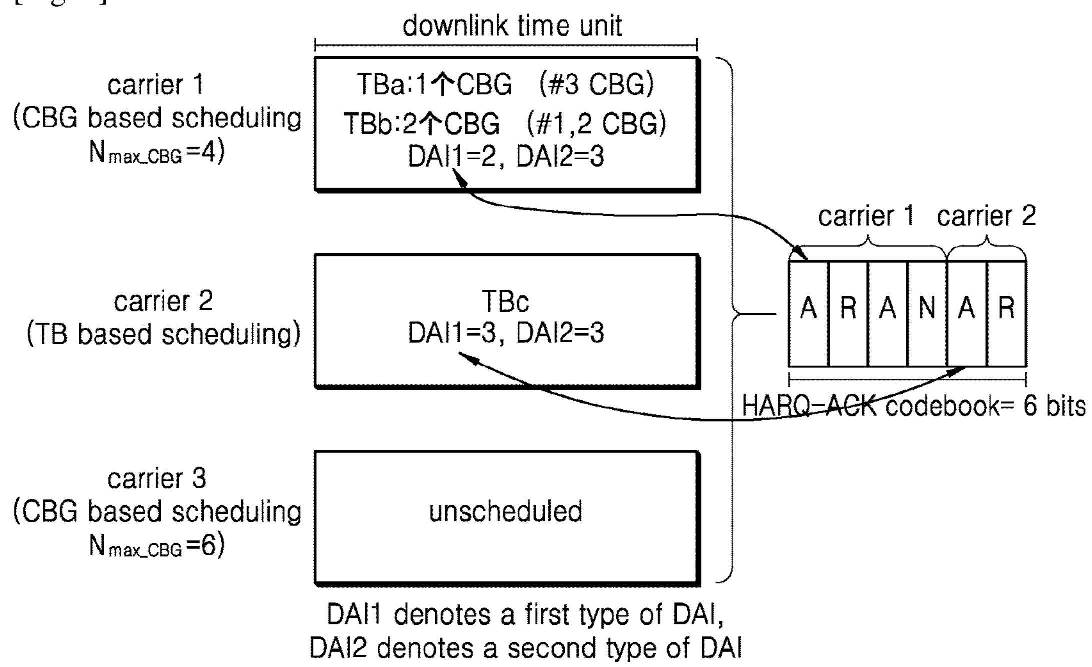

[Fig. 8]
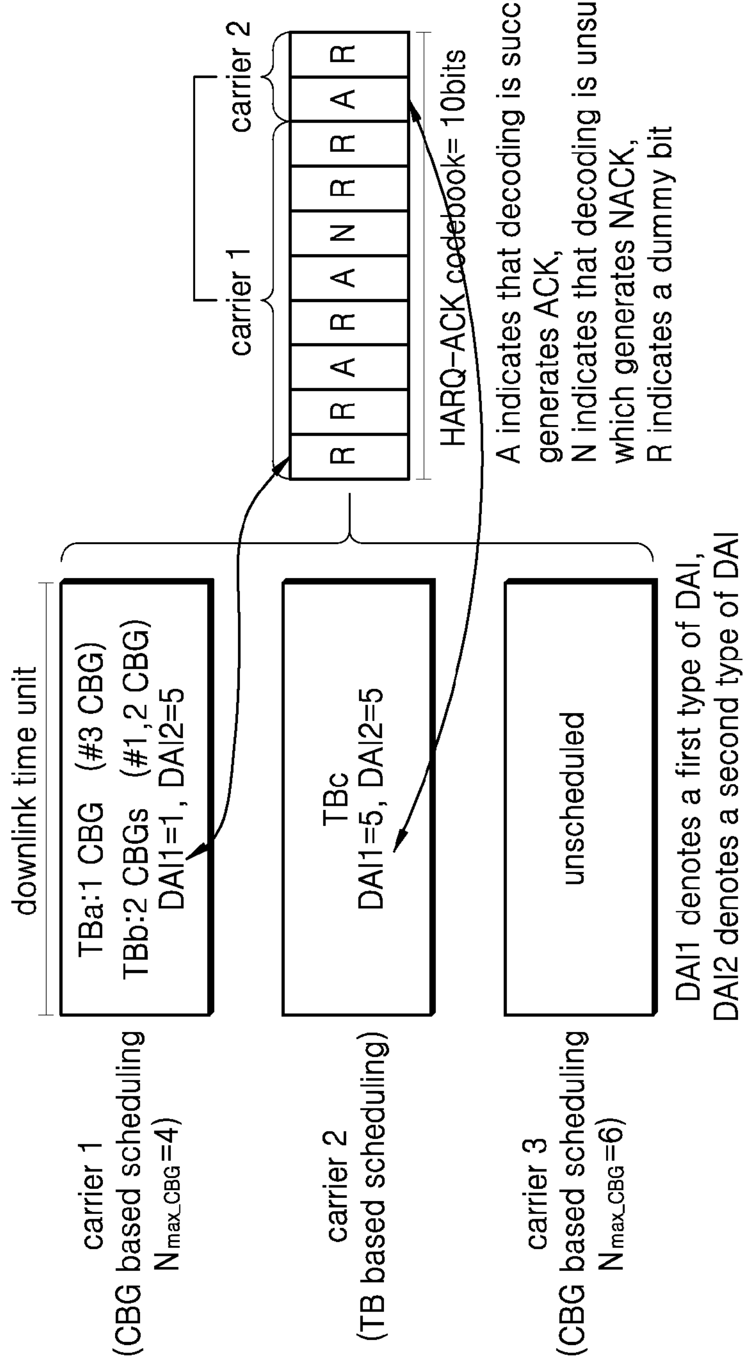

[Fig. 9]
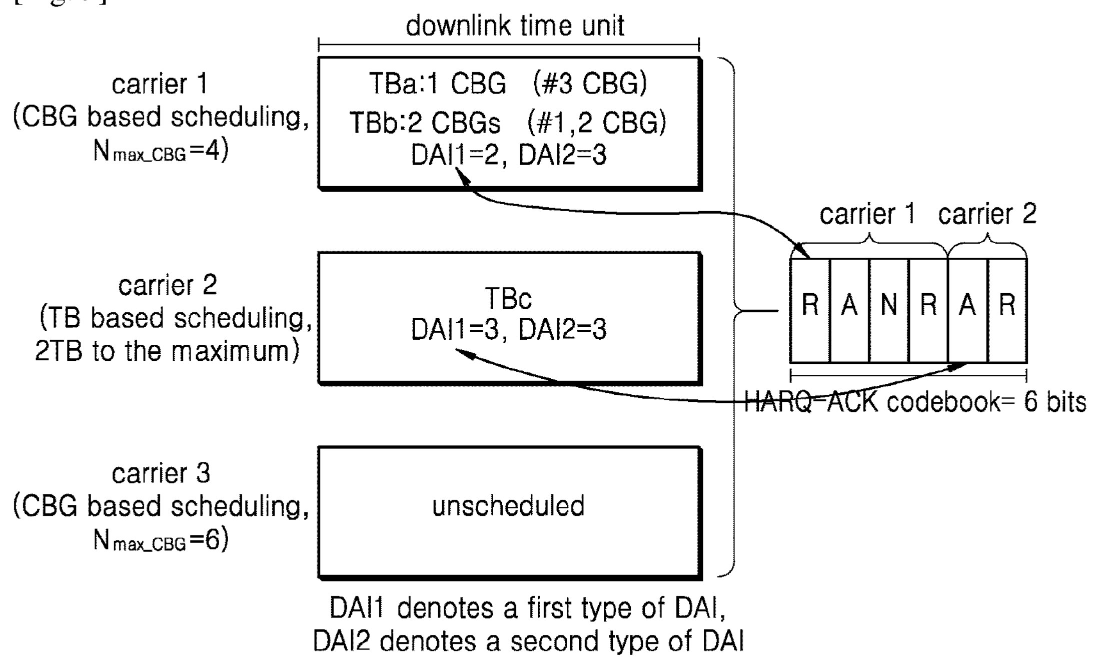

[Fig. 10]
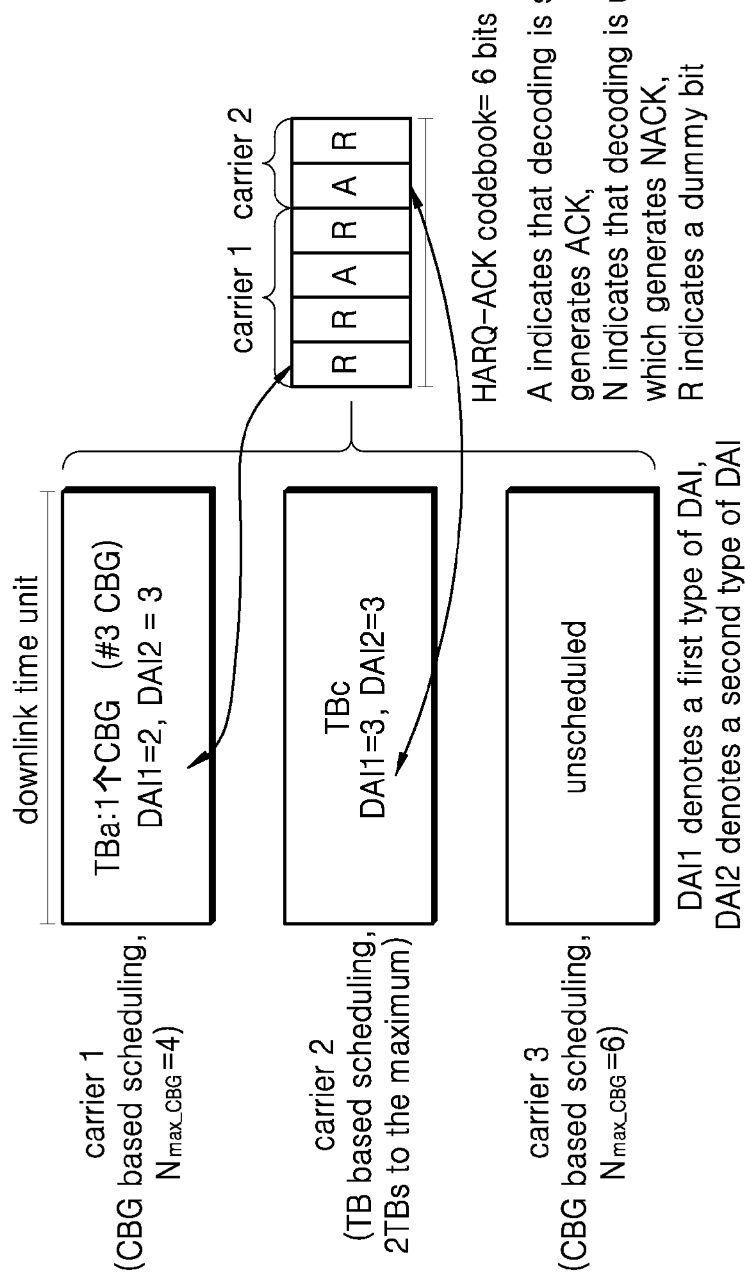

[Fig. 11]
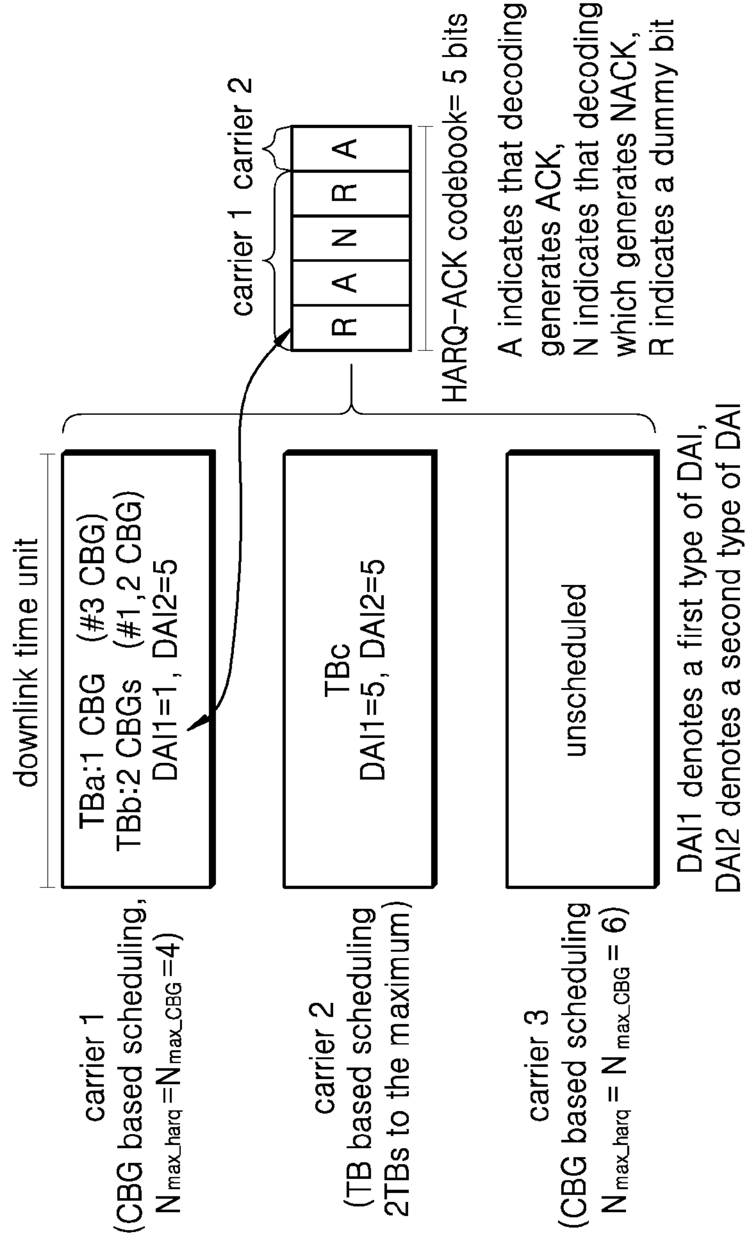

[Fig. 12]
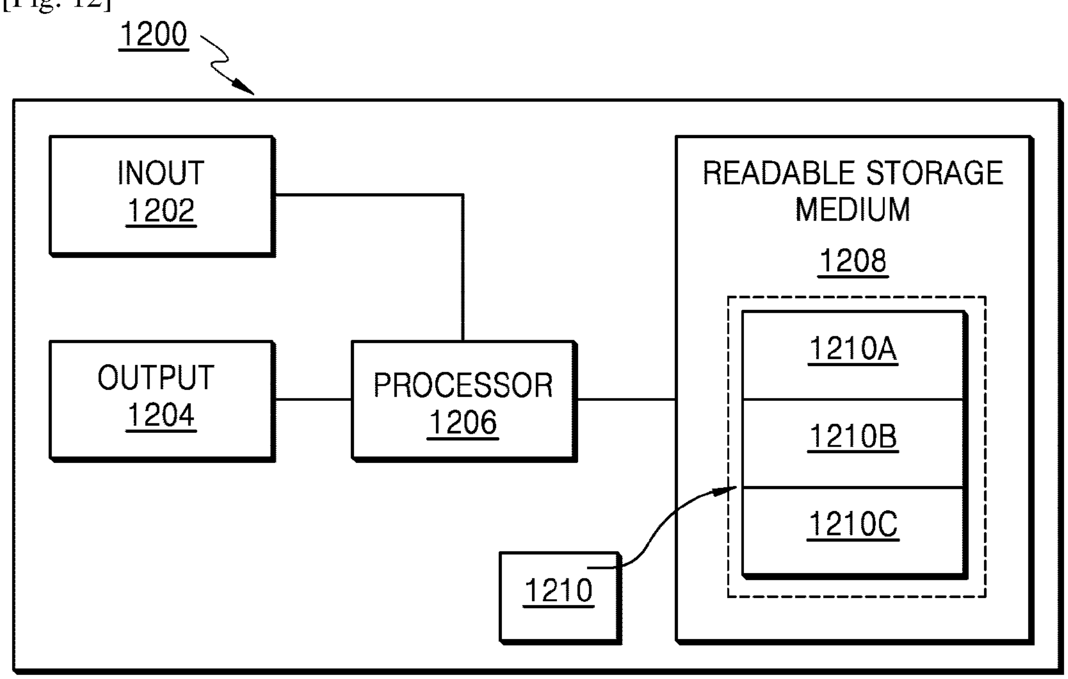
[Fig. 13]
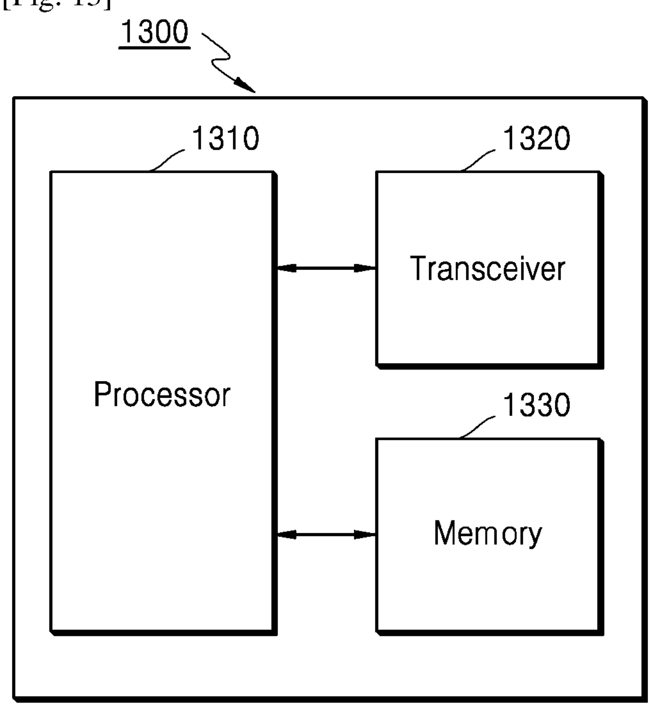

METHOD AND APPARATUS FOR TRANSMITTING AND RECEIVING SIGNAL IN MOBILE COMMUNICATION SYSTEM

PRIORITY

This application is a National Phase Entry of PCT International Application No. PCT/KR2018/004801 which was filed on Apr. 25, 2018, and claims priority to Chinese Patent Application Nos. 201710316545.7 and 201710816832.4, which were filed on May 5, 2017 and Sep. 11, 2017, respectively, the content of each of which is incorporated herein by reference.

BACKGROUND

1. Field

The disclosure relates generally to mobile communication technologies, and more particularly, to a downlink (DL) transmission scheduling method and a corresponding network node, a hybrid automatic repeat request (HART)-acknowledgment (ACK) feedback method and a corresponding user equipment (UE), a computer readable storage medium, and a communication system including the network node and the UE.

2. Related Art

To meet the increasing demand for wireless data traffic since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'.

The 5G communication system is intended to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional (FD)-MIMO, array antennas, analog beamforming, and large scale antenna techniques are being discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving networks, cooperative communication, coordinated multi-points (CoMP), reception-end interference cancellation, etc.

In the 5G system, frequency and quadrature amplitude modulation (FQAM), which is a combination of frequency shift keying (FSK) and quadrature amplitude modulation (QAM), and sliding window superposition coding (SWSC) have been developed as types of an advanced coding modulation (ACM), and filter bank multicarrier (FBMC), non-orthogonal multiple access (NOMA), and sparse code multiple access (SCMA) have been developed as advanced access technologies.

The Internet is evolving to the Internet of things (IoT) where distributed entities, i.e., things, exchange and process information without human intervention. The Internet of everything (IoE), which is a combination of IoT technology and big data processing technology through connection with a cloud server, has also emerged.

As technology elements, such as "sensing technology", "wired/wireless communication and network infrastructure", "service interface technology", and "security technology", have been demanded for IoT implementation, a sensor network, a machine-to-machine (M2M) communication, machine type communication (MTC), etc., have been recently researched. Such an IoT environment may provide intelligent Internet technology services by collecting and analyzing data generated among connected things. IoT may be applied to a variety of fields including smart homes, smart buildings, smart cities, smart cars or connected cars, smart grids, health care, smart appliances, and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas.

An application of a cloud RAN as the above-described big data processing technology may also be considered to be as an example of a convergence between 5G technology and IoT technology.

As described above, various services can be provided according to the development of a wireless communication system, and thus, a method for easily providing such services is required.

SUMMARY

An aspect of the disclosure is provided a DL scheduling signaling design and a HARQ-ACK feedback mechanism, which make uplink (UL) and DL control signaling overhead reasonable, without adversely affecting scheduling flexibility.

In accordance with an aspect of the disclosure, a method performed at a network node is provided for scheduling DL transmissions and a corresponding network node. The method includes determining, based on a number of transport blocks (TBs) scheduled in a DL transmission to be transmitted and a maximum number of code block groups (CBGs) dividable in the DL transmission, a maximum number of CBGs dividable in each TB of the DL transmission; determining a CBG configuration of CBGs scheduled in a corresponding TB based on a maximum number of CBGs dividable in each TB of the DL transmission; and transmitting DL control signaling indicating the CBG configuration.

In accordance with another aspect of the disclosure, provided are a method performed at a UE for HARQ-ACK feedback, a corresponding UE, and a communication system including the network node and UE.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a flow chart illustrating a method for scheduling a DL transmission in accordance with an embodiment;

FIG. 2 is a flow chart illustrating a method for feeding back a HARQ-ACK/NACK according to an embodiment;

FIG. 3 illustrates generation of a virtual CBG and an actual CBG according to an embodiment;

FIG. 4 illustrates generation of an actual CBG according to an embodiment;

FIG. 5 illustrates HARQ-ACK feedback according to an embodiment;

FIG. 6 illustrates HARQ-ACK feedback according to an embodiment;

FIG. 7 illustrates HARQ-ACK feedback according to an embodiment;

FIG. 8 illustrates HARQ-ACK feedback according to an embodiment;

FIG. 9 illustrates HARQ-ACK feedback according to an embodiment;

FIG. 10 illustrates HARQ-ACK feedback according to an embodiment;

FIG. 11 illustrates HARQ-ACK feedback according to an embodiment;

FIG. 12 illustrates a hardware arrangement of a network node and/or UE in accordance with an embodiment; and FIG. 13 illustrates a hardware arrangement of a network node and/or UE in accordance with an embodiment.

DETAILED DESCRIPTION

Hereinafter, various embodiments of the disclosure will be described in detail with reference to the accompanying drawings.

In the description of the embodiments, technical matters that are well known in a technical field of the disclosure and are not directly related to the disclosure will not be described. By omitting unnecessary descriptions, the subject matter of the disclosure will be more clearly described without being obscured.

Likewise, some elements may have been exaggerated, omitted, or schematically illustrated in the attached drawings. In addition, the size of each element may not substantially reflect its actual size. In each drawing, the same or corresponding element is denoted by the same reference numeral.

In addition, all or part of the functions, features, units, modules, etc., described in the different embodiments described below may be combined, deleted and/or modified to constitute new embodiments, and the embodiments are still within the scope of the present disclosure.

In addition, the terms "include" and "contain" and their derivatives in this disclosure are intended to be inclusive and not restrictive.

In the following, although various embodiments of the disclosure are described with reference to a base station and a UE as examples, the disclosure is not limited to this. For example, the disclosure is applicable to any wireless communication standard that is known or to be developed in the future, including but not limited to $2^{nd}$ generation (2G), $3^{rd}$ generation (3G), 4G, 5G, etc.

A base station may include, but is not limited to, a base transceiver station (BTS), a radio base station (RBS), a NodeB, an evolved node B (eNodeB), a relay station, a transmission point, etc. Thus, the term "base station" may be used interchangeably with a generic term such as "network node", including the aforementioned items, to indicate that it is a network side node capable of providing the same or similar functionality as a base station.

In addition, a UE may actually include the concepts of (but is not limited to) the following terms: a user device, a mobile station, a mobile terminal, a smart phone, a tablet, etc.

In order to at least partially solve or alleviate the above-described problems, the embodiments of the disclosure provide a DL transmission scheduling method and a network node, a HARQ-ACK feedback method, a UE, and corresponding computer-readable storage media and communication systems.

In accordance with a first aspect of the disclosure, a method performed at a network node is provided for scheduling a DL transmission. The method includes determining, based on a number of TBs that can be scheduled in a DL transmission to be transmitted and a maximum number of CBGs dividable in the DL transmission, a maximum number of CBGs dividable in each TB of the DL transmission; determining a CBG configuration of CBGs scheduled in a corresponding TB based on a maximum number of CBGs dividable in each TB of the DL transmission; and transmitting DL control signaling indicating the CBG configuration.

The maximum number of CBGs dividable in the DL transmission may be configured by higher layer signaling and does not vary with the maximum number of TBs that can be scheduled in the DL transmission.

The maximum number of TBs that can be scheduled may be configured by high-layer signaling. For example, the transmission mode configured by the base station when the number of TBs that can be scheduled is 1 is different from when the number of TBs that can be scheduled is 2. The number of TBs that can be scheduled can be regarded as the maximum number of TBs that can be scheduled, and this number semi-statically changes. For the transmission mode in which the number of TBs that can be scheduled is 2, the number of TBs that can be scheduled in the actual scheduling of the base station may be 1 or 2.

The number of TBs that can be scheduled in the DL transmission may be indicated by physical layer signaling. For example, the base station configures a transmission mode that allows for a maximum of 2 TBs to be scheduled and indicates by physical layer signaling, e.g., DL control information (DCI) whether one or two TBs can be scheduled at a time. The number of TBs that can be scheduled can be regarded as the number of TBs actually scheduled, and is a dynamic process.

For scheduling in special cases, such as scheduling of DCI 1A for fall back in an LTE system, how to determine the number of CBGs does not fall within the scope of the present application. For the fallback case, the TB-based scheduling is used instead of subdividing the TB into CBGs.

Determining, based on a number of TBs that can be scheduled in a DL transmission to be transmitted and a maximum number of CBGs dividable in the DL transmission, a maximum number of CBGs dividable in each TB of the DL transmission includes at least one of the following: if the DL transmission can schedules only one TB, determining the maximum number of CBGs dividable in the one TB to be equal to the maximum number of CBGs dividable in the DL transmission; if the DL transmission actually schedules one TB, determining the maximum number of CBGs dividable in the one TB to be equal to the maximum number of CBGs dividable in the DL transmission; if the DL transmission actually schedules one TB, which is an initial transmission, determining the maximum number of CBGs dividable in the one TB to be equal to the maximum number of CBGs dividable in the DL transmission, and the maximum number of CBGs that can be split in the TB at a retransmission of the TB remains unchanged; if the DL transmission is capable of scheduling two TBs, determining the maximum number of dividable CBGs of the two TBs respectively so that the sum of the maximum number of dividable CBGs of the two TBs equals the maximum number of CBGs dividable in the DL transmission and the maximum number of dividable CBGs of the two TBs are equal to each other or different by one; if the DL transmission actually schedules two TBs, determining the maximum number of dividable CBGs of the two TBs respectively so that the sum of the maximum number of dividable CBGs of the two TBs equals the maximum number of CBGs dividable in the DL transmission and the maximum number of dividable CBGs of the two TBs are equal to each other or different by one; if the DL transmission is capable of scheduling two TBs, determining the maximum number of dividable CBGs of the two TBs respectively so that the sum of the maximum number of dividable CBGs of the two TBs equals the maximum number of CBGs dividable in the DL transmission and the maximum number of dividable CBGs of the two TBs are equal to each other or different by one, and if only one of the TBs is scheduled by the DL transmission in retransmitting the two TBs, the maximum number of dividable CBGs of the one TB is the same as the maximum number of dividable CBGs of the TB when scheduling 2 TBs simultaneously.

Determining a CBG configuration of CBGs scheduled in a corresponding TB based on a maximum number of CBGs dividable in each TB of the DL transmission includes determining a CBG configuration of CBGs that may be scheduled in the respective TBs such that the number of CBGs scheduled in the respective TBs is less than or equal to the maximum number of dividable CBGs in the respective TBs.

Determining a CBG configuration of CBGs scheduled in a corresponding TB based on a maximum number of CBGs dividable in each TB of the DL transmission includes, for each TB, determining, based on the maximum number of dividable CBGs in the DL transmission, the maximum number of virtual CBGs for the corresponding TB; determining the number of virtual CBGs for the corresponding TB based on the size of the corresponding TB and the maximum number of virtual CBGs for the corresponding TB; and mapping the virtual CBGs to the actual CBGs to determine the configuration so that the number of actual CBGs does not exceed the maximum number of dividable CBGs in the corresponding TB.

Determining a CBG configuration of CBGs scheduled in a corresponding TB based on a maximum number of CBGs dividable in each TB of the DL transmission includes, for each TB, determining the number of CBGs that are actually schedule based on a size of the corresponding TB and a maximum number of CBGs dividable in the corresponding TB, so as to determine the CBG configuration.

The DL control signaling indicating the CBG configuration includes at least one of: an independent field for each CBG to indicate whether the corresponding CBG is scheduled; an independent field for each CBG to indicate if a HARQ buffer for the corresponding CBG should be cleared; an independent field for a plurality of CBGs to indicate if a HARQ buffer for the corresponding CBGs needs to be cleared; a first type of DL assignment index (DAI); and a second type of DAI.

The first type of DAI indicates one of the following: a sum of the number of CBGs scheduled in the HARQ-ACK feedback bundling window up to the currently scheduled DL time unit and the current carrier; a sum of the number of CBGs scheduled in the HARQ-ACK feedback bundling window up to the currently scheduled DL time unit and/or the latest DL time unit and/or carrier before the current carrier plus one; a sum of the maximum number of CBGs of the scheduled DL time unit and/or the DL carrier in the HARQ-ACK feedback bundling window up to the currently scheduled DL time unit and the current carrier; and a sum of the maximum number of CBGs of the scheduled DL time unit and/or the DL carrier in the HARQ-ACK feedback bundling window up to the currently scheduled DL time unit and/or the latest DL time unit and/or carrier before the current carrier plus one.

The second type of DAI indicates one of the following: a total number of bits of HARQ-ACK codebook; a total number of scheduled CBGs of all scheduled carriers from a first DL time unit among all scheduled DL time units to the current DL time unit in the HARQ-ACK feedback bundling window; and a total number of the maximum number of CBGs of all scheduled carriers from a first DL time unit among all scheduled DL time units to the current DL time unit in the HARQ-ACK feedback bundling window. The DL transmission may be a physical DL shared channel (PDSCH) transmission.

In accordance with a second aspect of the disclosure, a network node is provided for scheduling a DL transmission. The network node includes a CBG maximum number determining unit configured to determine, based on a number of TBs that can be scheduled in a DL transmission to be transmitted and a maximum number of CBGs dividable in the DL transmission, a maximum number of CBGs dividable in each TB of the DL transmission; a CBG configuration determining unit configured to determine a CBG configuration of CBGs scheduled in a corresponding TB based on a maximum number of CBGs dividable in each TB of the DL transmission; and a control signaling transmitting unit configured to transmit DL control signaling indicating the CBG configuration.

In accordance with a third aspect of the disclosure, a network node is provided for scheduling a DL transmission. The network node includes a processor, a memory with instructions stored there in, which when executed by the processor, causes the processor to: determine, based on a number of TBs that can be scheduled in a DL transmission to be transmitted and a maximum number of CBGs dividable in the DL transmission, a maximum number of CBGs dividable in each TB of the DL transmission; determine a CBG configuration of CBGs scheduled in a corresponding TB based on a maximum number of CBGs dividable in each TB of the DL transmission; and transmit DL control signaling indicating the CBG configuration In accordance with a fourth aspect of the disclosure, a computer readable storing medium is provided with instructions stored therein, which when executed by a processor, causes the processor to implement the method according to any of the above-described aspects of the disclosure.

In accordance with a fifth aspect of the disclosure, a method performed at a UE is provided for reporting a HARQ-ACK. The method includes receiving DL control signaling; generating a HARQ-ACK codebook according to the DL control signaling, a reference TB in a DL transmission corresponding to the DL control signaling, and a decoding result for the DL transmission; and transmitting a HARQ-ACK corresponding to the DL transmission according to the generated HARQ-ACK codebook.

The DL control signaling may be DCI and/or higher layer signaling received from a network node.

The DL control signaling includes at least one of the following: a first type of DAI; a second type of DAI; information used to determine the number of TBs based on which the HARQ-ACK is fed back; the maximum number of dividable CBGs in the TB; and information regarding whether the HARQ-ACK feedback performs a spatial dimension bundling.

In the same uplink transmission, when the number of TBs with at least one carrier that can be scheduled to feedback a HARQ-ACK is greater than 1: if the DL control signaling indicates that no spatial dimension bundling is performed, the number of TBs based on which the HARQ-ACK is fed back is equal to 2; if the DL control signaling indicates that a spatial dimension bundling is performed, the number of TBs based on which the HARQ-ACK is fed back is equal to 1.

A bit length of the ACK/NACK for the DL transmission is: a product of the maximum number of CBGs divisible in a TB and the number of TBs based on which the HARQ-ACK is fed back; a product of a number of CBGs actually scheduled by the reference TB and the number of TBs based on which the HARQ-ACK is fed back.

The reference TB is a TB with a maximum number of CBGs actually scheduled.

Generating a HARQ-ACK codebook according to the DL control signaling, a reference TB in a DL transmission corresponding to the DL control signaling, and a decoding result for the DL transmission comprises: according to a second type of DAI of the DL control signaling, determining a bit length of the HARQ-ACK codebook as a product of the value of the second type of DAI and the number of TBs based on which the HARQ-ACK is fed back.

Generating a HARQ-ACK codebook according to the DL control signaling, a reference TB in a DL transmission corresponding to the DL control signaling, and a decoding result for the DL transmission includes: determining, according to a first type of DAI of the DL control signaling, a start point of a bit position of ACK/NACK of the DL transmission in the HARQ-ACK codebook.

Determining, according to a first type of DAI of the DL control signaling, a start point of a bit position of ACK/NACK of the DL transmission in the HARQ-ACK codebook includes one of: determining a start point of a bit position of the ACK/NACK of the DL transmission in the HARQ-ACK codebook as a first type of DAI of the DL control signaling; determining a start point of a bit position of the ACK/NACK of the DL transmission in the HARQ-ACK codebook as a first type of DAI of the DL control signaling minus a bit length of the ACK/NACK of the DL transmission plus 1; determining a start point of a bit position of the ACK/NACK of the DL transmission in the HARQ-ACK codebook as a product of a first type of DAI of the DL control signaling and the number of TBs based on which the HARQ-ACK is fed back minus one; and determining a start point of a bit position of the ACK/NACK of the DL transmission in the HARQ-ACK codebook as a product of a first type of DAI of the DL control signaling and the number of TBs based on which the HARQ-ACK is fed back minus a bit length of the ACK/NACK of the DL transmission plus 1.

Generating a HARQ-ACK codebook according to the DL control signaling, a reference TB in a DL transmission corresponding to the DL control signaling, and a decoding result for the DL transmission comprises determining the bit length of ACK/NACK of the DL transmission as a product of the maximum number of dividable CBGs in a TB and the number of TBs based on which the HARQ-ACK is fed back, wherein ACK/NACKs of scheduled CBG in scheduled TBs are generated according to a cyclic redundancy check (CRC) checksums of the actually scheduled CBGs, and ACK/NACKs of the unscheduled CBGs are dummy bits, and wherein the ACK/NACK of the unscheduled TBs are dummy bits.

Generating a HARQ-ACK codebook according to the DL control signaling, a reference TB in a DL transmission corresponding to the DL control signaling, and a decoding result for the DL transmission includes: determining bit length of ACK/NACK of the DL transmission as a product of a number of CBGs actually scheduled by the reference transmission block and the number of transmission blocks based on which the HARQ-ACK is fed back, wherein an ACK/NACK of the reference transmission block is generated according to a CRC checksum of the actually scheduled CBGs, and wherein an ACK/NACK of a non-reference TB is generated according to a CRC checksum of CBGs actually scheduled by the non-reference TB, and an extra dummy bit is generated such that the bit length of the ACK/NACK of the non-reference TB is equal to the number of CBGs actually scheduled by the reference TB.

Generating a HARQ-ACK codebook according to the DL control signaling, a reference TB in a DL transmission corresponding to the DL control signaling, and a decoding result for the DL transmission includes: determining the bit length of ACK/NACK bit of the DL transmission as the maximum number of CBGs dividable by the TB when the DL control signaling indicates a spatial dimension bundling, wherein the ACK/NACKs are obtained by logically ANDing ACK/NACKs of CBGs scheduled in respective TBs and having the same CBG index.

Generating a HARQ-ACK codebook according to the DL control signaling, a reference TB in a DL transmission corresponding to the DL control signaling, and a decoding result for the DL transmission includes: if all CBGs of one TB are scheduled by the DL transmission, when it is determined that all CBGs of the TB are correctly detected by CRC checksums for each CBG: a NACK value for each of CBGs of the TB is generated if the TB is not correctly detected by a CRC checksum for the TB, and a ACK value for each of CBGs of the TB is generated if the TB is correctly detected by a CRC checksum for the TB.

Generating a HARQ-ACK codebook according to the DL control signaling, a reference TB in a DL transmission corresponding to the DL control signaling, and a decoding result for the DL transmission includes: if a current DL transmission does not include all the CBGs of one TB and all CBGs of the TB are correctly detected by CRC checksums for each CBG up to the current scheduling time but the TB is not correctly detected by a CRC checksum, the ACK/NACK is generated as at least one of the following: a NACK value for each of CBGs of the TB is generated; and a NACK value for each unscheduled CBGs in the current scheduling for which ACKs were previously fed back is generated; an ACK/NACK value opposite to a value of a predefined dummy bit for each of the unscheduled CBGs in the current scheduling for which ACKs were previously fed back is generated.

Generating a HARQ-ACK codebook according to the DL control signaling, a reference TB in a DL transmission corresponding to the DL control signaling, and a decoding result for the DL transmission includes: feeding back not only ACK/NACKs of the divided CBGs for the DL transmission but also a HARQ-ACK of a corresponding TB for the DL transmission. In some embodiments, the DL transmission is a PDSCH transmission.

In accordance with a sixth aspect of the disclosure, a UE is provided for feeding back a HARQ-ACK. The UE includes a control signaling receiving unit configured to receive DL control signaling; a codebook generating unit configured to generate a HARQ-ACK code according to the DL control signaling, a reference TB in a DL transmission corresponding to the DL control signaling, and a decoding result for the DL transmission; and a feed back unit configured to feed a HARQ-ACK corresponding to the DL transmission back according to the generated HARQ-ACK codebook.

In accordance with a seventh aspect of the disclosure, a UE is provided for feeding back a HARQ-ACK. The UE includes a processor, a memory with instructions stored therein, which when executed by the processor, cause the processor to: generate a HARQ-ACK code according to the DL control signaling, a reference TB in a DL transmission corresponding to the DL control signaling, and a decoding result for the DL transmission; and feed back a HARQ-ACK corresponding to the DL transmission according to the generated HARQ-ACK codebook.

In accordance with an eighth aspect of the disclosure, a computer readable storing medium is provided with instructions stored therein, which when executed by a processor, causes the processor to implement a method according to any of the above-described aspects of the disclosure.

In accordance with an aspect of the disclosure, a communication system is provided. The communication system includes a network node according to the second or third aspect of the disclosure and one or more UEs according to the sixth or seventh aspect of the disclosure.

In accordance with the above-described aspects of the disclosure, it is possible to effectively reduce HARQ-ACK feedback overhead when using a CBG transmission and to prevent a base station (i.e., a network node) and a UE from misunderstanding a size of the HARQ-ACK codebook (or codebook). Particularly, when both a CBG transmission and a MIMO mode are used, the embodiments of the disclosure effectively reduce overhead of a DL control channel and an uplink channel carrying HARQ-ACK feedback.

In order to support more flexible scheduling, the 3$^{rd}$ generation partnership project (3GPP) has decided to support variable HARQ-ACK feedback delay in 5G.

In 5G systems, whether a frequency division duplex (FDD) or time division duplex (TDD) system, for a specific DL time unit (e.g., a DL slot or a DL mini-slot), uplink time units that may be used to provide a HARQ-ACK feedback are variable. For example, the delay of a HARQ-ACK feedback may be dynamically indicated by physical layer signaling, and different HARQ-ACK delays may also be determined according to factors such as different services or UE capabilities. Therefore, even in an FDD system, HARQ-ACKs for DL data transmission of multiple DL time units may be fed back in one uplink time unit.

In addition, considering that the size of a TB in a 5G system may further increase, and in order to better support the coexistence of different service types, for example, puncturing part of a PDSCH of enhanced mobile broadband (eMBB) service for sending ultra-reliable and low latency communication (URLLC), 3GPP has decided to further refine the granularity of scheduling in 5G, extending scheduling in TB unit in LTE to scheduling in code block (CB)/CBG unit. The scheduling in a CB/CBG unit is mainly used for retransmission.

5G systems still support MIMO transmission. When operating in a MIMO transmission mode, multiple TBs may be scheduled simultaneously on one DL time unit of one carrier. For example, for an initial transmission, only 1 TB is scheduled when the number of layers for MIMO transmission is less than or equal to four. When the number of layers is greater than 4, 2 TBs are scheduled. For retransmissions, 2 TBs may be scheduled even if the number of layers is less than or equal to 4. Of course, the number of TBs actually scheduled by the base station at each time is dynamically variable.

In addition, 5G still supports carrier aggregation in order to utilize various spectrum resources flexibly. That is, the base station may configure multiple carriers for one UE. In the 5G system, dimensions are increased compared to LTE in terms of either DL scheduling or uplink feedback HARQ-ACK.

FIG. 1 is a flowchart illustrating a method 100 for scheduling a DL transmission according to an embodiment.

Referring to FIG. 1, prior to the start of the method 100, the base station may generally configure whether a scheduling mode of a carrier (e.g., carrier Ci below) is a TB-based scheduling or a CBG-based scheduling. If it is configured as a CBG-based scheduling, the base station may also configure the maximum number of schedulable CBGs, for example, set as Nmax_CBG. When configuring the value, the base station can explicitly configure it as the maximum number of schedulable CBGs. In addition, the maximum number of schedulable CBGs may also be indicated implicitly by configuring the maximum number of the HARQ-ACK bits that can be fed back for each scheduling. For ease of description, FIG. 1 is described in terms of the maximum number of schedulable CBGs. However, those skilled in the art will understand that the disclosure is not limited thereto. In addition, the base station may further configure whether a HARQ-ACK feedback mode of a UE with which it is associated is based on a TB-based or a CBG-based granularity.

Unless otherwise specified, the disclosure does not limit how a base station divides one TB into multiple CBs, or how it combines multiple CBs into CBGs. For example, the base station may determine, according to the size of the TB, how many CBs to divide and then determine how many CBGs to combine according to Nmax_CBG.

The signaling for configuring the HARQ-ACK feedback mode may be the same as the signaling for configuring the carrier scheduling mode. For example, if the scheduling mode of carrier Ci is configured to be based on TB, the HARQ-ACK feedback may also be implicitly configured to be based on TB. Alternatively, the signaling used to configure the HARQ-ACK feedback mode may be independent from the signaling used to configure the carrier scheduling mode. For example, the scheduling mode of carrier Ci may be configured to be based on TB, but the HARQ-ACK feedback is configured to be based on CBG. In addition, all or part of the above configuration information may be semi-statically configured by high-layer signaling. If it is configured as a CBG based scheduling/feedback mode, the base station may explicitly indicate scheduling information of each CBG in the DCI, may also implicitly indicate it, and the UE may determine which CBGs are scheduled by a predefined criterion. The disclosure does not make a particular limit on this.

In addition, the base station may further configure a MIMO transmission mode (which may also be referred to as a MIMO scheduling mode). For example, the transmission between the base station and the UE may be configured as a single-input multiple-output (SIMO) or MIMO transmission mode, but the number of layers of MIMO is not limited. In addition, the transmission between the base station and the UE may also be configured to a transmission mode that transmits at most one TB or two TBs.

The base station may configure the maximum number of schedulable CBGs Nmax_CBG for one schedule. If multiple TBs are scheduled in one schedule, a total number of scheduled CBGs in all TBs does not exceed Nmax_CBG. If only one TB is scheduled in one schedule, a total number of scheduled CBGs for that TB usually does not exceed Nmax_CBG.

The base station may configure the maximum number of schedulable CBGs Nmax_CBG for one TB in one schedule, so that the total number of CBGs scheduled for one TB does not exceed Nmax_CBG. In this case, if 2 TBs are scheduled in one schedule, a total number of CBGs scheduled in 2 TBs does not exceed 2*Nmax_CBG. Therefore, the base station may configure whether the maximum number of CBGs Nmax_CBG is the total number of CBGs in one schedule or the total number of CBGs of one TB in one schedule. The information related to the configuration may be semi-statically configured by high-level signaling.

The maximum number of CBGs Nmax_CBG can be defined in the standard as the total number of CBGs in one schedule, or can be defined in the standard as the total number of CBGs for one TB in one schedule.

In step S110, the base station determines, according to the number of TBs that can be scheduled in the DL transmission to be transmitted to the UE and the maximum number of dividable CBGs in the DL transmission, the maximum number of CBGs dividable in each TB of the DL transmission.

If the scheduling mode of a carrier (e.g., carrier Ci) is configured by the base station as a CBG based scheduling as described above, the base station may determine, based on the configured maximum number of TBs that can be scheduled and the maximum number of CBGs Nmax_CBG determined as above, the maximum number of CBGs that can be scheduled in each TB, Nmax_CBG_TBi.

In step S110, the base station may determine the maximum number of CBGs Nmax_CBG_TBi that can be actually scheduled in each TB according to the maximum number of TBs that can be scheduled NTB and/or a predefined criterion. The predefined criterion may be Equation (1):

$$N\max\_CBG\_TBi = N\max\_CBG/NTB \quad (1)$$

If the scheduling mode of a carrier (e.g., carrier Ci) is configured by the base station as a CBG based scheduling as described above, the base station may determine, based on the number of TBs that are actually scheduled and the maximum number of CBGs Nmax_CBG determined as above, the maximum number of CBGs that can be scheduled in each TB, Nmax_CBG_TBi.

In step S110, if the maximum number of dividable CBGs in the DL transmission, Nmax_CBG, is the total number of CBGs in one schedule, the base station may determine the maximum number of CBGs Nmax_CBG_TBi that can be actually scheduled in each TB according to the maximum number of TBs that can be scheduled NTB and/or a predefined criterion. As described above, the predefined criterion may be Equation (1).

If Nmax_CBG is not an integer multiple of NTB, Nmax_CBG may be divided into NTB TBs as far as possible in accordance with the principle of equal division. For example, if Nmax_CBG=5 and NTB=2, Nmax_CBG_TB1 of the first TB may be 2 and Nmax_CBG_TB2 of the second TB may be 3 or Nmax_CBG_TB1 of the first TB may be 3 and Nmax_CBG_TB2 of the second TB may be 2.

In step S120, the base station determines the CBG configuration of the CBG scheduled in a corresponding TB based on the maximum number of dividable CBGs in each TB of the DL transmission.

In order to determine the configuration of the actually schedulable CBGs, it can be implemented in at least the following two manners. Alternatively, the configuration of CBGs for each TB is determined in other methods depending on the size of the TB and Nmax_CBG_TBi.

First CBG Configuration For each TB, the base station may determine the maximum number of virtual CBG Nvirtual_max_CBG_TBi of the corresponding TB by Nmax_CBG. For example, let Nvirtual_max_CBG_ TBi=Nmax_CBG. Then, the base station may determine the number of scheduled virtual CBGs Nvirtual_CBG_TBi according to the TB size and Nvirtual_max_CBG_TBi. Next, the base station may map the virtual CBG to the actual CBG in a predefined manner so that the number of CBGs that can be actually scheduled does not exceed the maximum number of CBGs Nmax_CBG_TBi that can be actually scheduled in the corresponding TB. In this way, the CBG configuration in each TB can be determined.

For example, as illustrated in the lower part of FIG. 3, if Nmax_CBG=4, the base station schedules 2 TBs, TBa and TBb in this scheduling, and thus Nmax_CBG_TBi=2 as described above. Taking TBa as an example, Nvirtual_max_CBG_TBa=4 and Nmax_CBG_TBa=2. It is assumed that the size of TBa is 50000 and can be divided into six CBs and divided into four virtual CBGs. The first and second CBs constitute a first virtual CBG, the third and fourth CBs constitute a second virtual CBG, the fifth CB constitutes the third virtual CBG, and the sixth CB constitutes the fourth virtual CBG. The four virtual CBGs can be mapped into two actual CBGs. Then, the first and second virtual CBGs can be mapped to the first actual CBG, and the third and fourth virtual CBGs can be mapped to the second actual CBGs.

As will be understood by those skilled in the art, the above example is for helping a reader to understand, and does not exclude that there may be other predefined ways to map 4 virtual CBGs into 2 actual CBGs. For example, the first and third virtual CBGs may be mapped to the first actual CBG, and the second and fourth virtual CBGs may be mapped to the second actual CBGs.

In addition, as shown in the upper part of FIG. 3, if only one TBa is scheduled by the base station in this scheduling, Nmax_CBG_TBi=4. In this case, 4 virtual CBGs may correspond to 4 actual CBGs.

Second CBG Configuration

For each TB, the base station may determine the number of actually scheduled CBGs based on the size of the corresponding TB and the maximum number of CBGs Nmax_CBG_TBi that can be actually scheduled.

For example, as shown on the right of FIG. 4, if Nmax_CBG=4, in this scheduling, the base station schedules 2 TBs, Tba, and TBb, and therefore, Nmax_CBG_TBi=2. Taking TBa as an example, assuming that the size of TBa is 50000 and can be divided into 6 CBs, the number of actually scheduled CBGs is 2 (because the number of CBs>1). The first, second, and third CBs constitute the first actual CBG, and the fourth, fifth, and sixth CBs constitute the second actual CBG.

For example, as shown on the left of FIG. 4, if only one TB is scheduled by the base station in this scheduling, the first and second CBs constitute the first actual CBG, the third and fourth CBs constitute the second actual CBG, the fifth CB constitutes the third actual CBG, and the sixth CB constitutes the fourth actual CBG.

From the above description, it can be seen that the “2nd CBG Configuration” is simpler in implementation, but the “first CBG Configuration” is more robust in the event that a UE misses a DCI, and in some cases it may also improve the efficiency of retransmission, given below are some examples.

The number of TBs scheduled by the base station each time may be different, but Nmax_CBG_TBi does not change with the number of actually scheduled TBs. For example, the maximum number of TBs that can be scheduled by the base station by high layer signaling is NTB=2. If only one TB is scheduled in the current DL transmission, for the TB, Nmax_CBG_TBi=Nmax_CBG/2 instead of Nmax_CBG_TBi=Nmax_CBG.

The number of TBs scheduled by the base station each time may be different. For example, the base station may determine Nmax_CBG_TBi according to the number of TBs actually scheduled for the transmission. Therefore, Nmax_CBG_TBi for each scheduling may be the same or different for different TBs. For the same TB, in one implementation, Nmax_CBG_TBi is determined based on the number of TBs of the transmission at retransmission and initial transmission or at different times of retransmission. Alternatively, for the same TB, Nmax_CBG_TBi remains unchanged and is determined based on the number of TBs at the initial transmission of the TB for retransmissions and initial transmissions, or for different times of retransmission.

For example, the base station schedules two TBs, TBa and TBb, which are initial transmissions. Nmax_CBG_TBa=Nmax_CBG_TBb=2. If TBb is successfully transmitted, but TBa transmission fails, the base station schedules only TBa in retransmission. In this case, Nmax_CBG_TBa=4.

According to the first CBG configuration, Nmax_CBG_TBa=2 when the base station schedules the initially transmitted TBa, where CB1~4 are actually scheduled CBG1, and CB5~6 are actually scheduled CBG2. Assuming that the UE fails to demodulate the CBG2 but successfully demodulates the CBG1, the base station schedules CBs 5 to 6 when scheduling the retransmission of the TBa. At this point, Nmax_CBG_TBa=4. Then, the base station indicates the CBGs scheduled at this time to be CBG3 and CBG4, that is, CBs 5~6.

According to the second CBG configuration, when the base station schedules an initially transmitted TBa, Nmax_CBG_TBa=2, where CB1~3 are actually scheduled CBG1 and CB4~6 are actually scheduled CBG2. Assuming that the UE fails to demodulate the CBG2 but successfully demodulates the CBG1, the base station schedules the CBs 4 to 6 when scheduling retransmission of the TBa. At this point, Nmax_CBG_TBa=4. CBGs are regrouped, i.e., the first and second CBs constitute the first CBG, the third and fourth CBs constitute the second CBG, the fifth CB constitutes the third CBG, and the sixth CB constitutes the fourth CBG. In order to retransmit CB4~6, the base station indicates the CBG scheduled at this time to be CBG2, 3 and 4, i.e., CB3~6.

For example, the base station schedules 1 TB, TBa, which is the initial transmission. Nmax_CBG_TBa=4. If TBa transmission fails, the base station schedules to retransmit the TB and schedules an initially transmitted TBb. At this time, Nmax_CBG_TBa=Nmax_CBG_TBb=2.

According to the first CBG configuration, when the base station schedules the initially transmitted TBa, Nmax_CBG_TBa=4, where the first and second CBs constitute the first actually scheduled CBG, the third and fourth CBs constitute the second actually scheduled CBG, the fifth CB constitutes the third actually scheduled CBG, and the sixth CB constitutes the fourth actually scheduled CBG. It is assumed that the UE fails to demodulate CBG2, but successfully demodulates CBG1, 3, and 4. The base station schedules CB3~4 when scheduling to retransmit TBa. At this point, Nmax_CBG_TBa=2. Then, the base station indicates that the CBG scheduled at this time is CBG1, i.e., CB1~4.

According to the 2nd CBG configuration, when a base station schedules an initially transmitted TBa, Nmax_CBG_TBa=4, where the first and second CBs constitute the first actually scheduled CBG, the third and fourth CBs constitute the second actually scheduled CBG, the fifth CB constitutes the third actually scheduled CBG, and the sixth CB constitutes the fourth actually scheduled CBG. It is assumed that the UE fails to demodulate CBG2, but successfully demodulates CBG1, 3, and 4. When base station schedules to retransmit TBa, CB3~4 are scheduled. At this point, Nmax_CBG_TBa=2. The CBGs are regrouped, i.e., the first, second, third CBs constitute the first CBG, and the fourth, fifth, sixth CBs constitute the second CBG. In order to retransmit CB3~4, the base station instructs the CBGs scheduled at this time to be CBG1 and CBG2, i.e., all CBs.

For example, the base station schedules two TBs, TBa and TBb, which are initial transmissions. Nmax_CBG_TBa=Nmax_CBG_TBb=2. If all CBGs of TBb are successfully transmitted, but part of CBGs of TBa are unsuccessfully transmitted, only the TBa will be scheduled when the base station schedules retransmission. In this case, Nmax_CBG_TBa=2.

According to the second CBG configuration, when a base station schedules an initially transmitted TBa, Nmax_CBG_TBa=2, where CB1~3 constitute actually scheduled CBG1 and CB4~6 constitute actually scheduled CBG2. Assuming that the UE fails to demodulate the CBG2 but successfully demodulates the CBG1, the base station schedules CBs 4 to 6 when scheduling retransmission of the TBa. In this case Nmax_CBG_TBa=2, the base station indicates that the CBG scheduled at this time is CBG2.

For example, the base station schedules 2 TBs, TBa and TBb, where both TBa and TBb are initial transmissions. Nmax_CBG_TBa=Nmax_CBG_TBb=2. If all CBGs of. TBb are successfully transmitted, but part of CBGs of TBa is unsuccessfully transmitted, the base station may schedule retransmission of the part of TBa and a new transmission of TBc when scheduling retransmission. In this case, Nmax_CBG_TBa=Nmax_CBG_TBc=2.

It may happen that the UE misses the DCI scheduling the initial transmission of a certain TB and cannot determine Nmax_CBG_TBi at the initial transmission. The base station can avoid this confusion by scheduling. For example, the last transmission is a transmission of 2 TBs. If the base station can determine that the received HARQ-ACK corresponding to the previous transmission is discontinuous transmission (DTX)/DTX, the base station schedules these two TBs again when scheduling the next time. If the last transmission is a transmission of 2 TBs, and if the base station can determine that one received HARQ-ACK corresponding to the last transmission was an ACK of a CBG for at least one TB, the base station may schedule only one TB or both TBs simultaneously.

For example, the base station schedules 1 TB, TBa, which is an initial transmission. Nmax_CBG_TBa=4. If TBa is unsuccessfully transmitted, the base station schedules retransmission of this TB. One way to avoid an increase in the number of bits of HARQ-ACK feedback caused by scheduling two TBs simultaneously is that the base station cannot schedule other TBs before the TBa is successfully transmitted. This also avoids the problem that the UE cannot determine the Nmax_CBG_TBa at the initial transmission when the UE misses the DCI scheduling the initial transmission of the TBa but receives the retransmission of the TBa and the DCI of another TB. Alternatively, the base station may schedule other TBs such as TBb at the same time and Nmax_CBG_TBa=Nmax_CBG_TBb=4. In order to avoid the increase of HARQ-ACK bits, the UE automatically bundles the CBG dimensions so that the number of HARQ-ACK bits fed back by the two TBs is still 4. Specifically, make reference to the part regarding HARQ-ACK feedback.

More generally, embodiments of the present disclosure do not limit how a base station divides one or more TBs into CBs, and does not limit the specific methods of constituting the virtual CBGs.

In step S130, the base station may transmit DL control signaling indicating the CBG configuration determined in step S120. For example, the base station may generate a DCI including CBG scheduling or configuration information according to the aforementioned manner and send it to the UE over a DL control channel (e.g., a PDCCH). The DCI including the CBG scheduling or configuration information generated by the base station may be generated in one of the following manners.

In some embodiments, the base station may indicate scheduling information independently for each TB. For example, each TB has an independent modulation and coding scheme (MCS) indication, a redundancy version (RV) indication, a new data indicator (NDI), etc. There may be one NDI for each TB, or one NDI (or bit information with the same effect) for CBGs of each TB.

In addition, the base station may indicate scheduling or configuration information for CBGs of each TB, respectively. For example, one or more of the following information may be included:

(1) Each CB/CBG may have an independent bit field (or sometimes a field) for indicating whether the corresponding CB/CBG is scheduled.

Assuming Nmax_CBG=4, and it is to schedule NTB=2, then Nmax_CBG_TBi=2. For each of the two CBGs for each TB, there is a 1-bit field to indicate whether the base station has scheduled this CBG. If the 1 bit is toggled relative to a corresponding bit in the initial transmission scheduling the same TB, then this CBG is not scheduled. This 1 bit does not change with respect to the corresponding bit of the initial transmission scheduling the same TB, indicating that this CBG is scheduled. In some embodiments, the 1 bit indicates that the CBG is scheduled or not scheduled according to a predefined value of 0 or 1.

For an initial transmission, the bit may not be used to indicate whether the corresponding CB/CBG is scheduled, but rather to indicate that this TB is the initial transmission. For example, when all bits of all CBGs of a TB are toggled with respect to this bit in the DCI of the initial transmission of the previous TB scheduling the same HARQ process, it indicates that this TB is the initial transmission; otherwise, it indicates a retransmission. That is, for an initial transmission of one TB, each of the bits of the respective CBGs should be the same value, and all bits are toggled with respect to those of the initial transmission of the previous TB scheduling the same HARQ process.

The following describes the scenario where the number of TBs for the current transmission is different from the number of TBs for the current initial transmission:

(a) In the last initial transmission, the base station only scheduled one new TBa with four CBGs. However, in the current transmission, the base station schedules two new TBs, TBb and TBc, and there are 2 bits for 2 CBGs of each TB, i.e., a total of 4 bits. Assuming that TBa corresponds to TBb (e.g., the HARQ process is the same), 2 bits of TBb are toggled with respect to 4 bits of TBa and 2 bits of TBc are toggled with respect to those of the previous TB of the same HARQ process.

(b) In the last initial transmission, the base station schedules 2 new TBs, TBb and TBc, but in the current transmission, the base station only schedules 1 new TBa. Assuming that TBa corresponds to TBb (e.g., the HARQ process is the same), in the same way, 4 bits of TBa are toggled with respect to 2 bits of TBb.

In addition, each CB/CBG has an individual field for indicating whether the corresponding CB/CBG is scheduled, if the DCI also contains an NDI for TB, and whether the TB is an initial transmission or a retransmission is indicated by the NDI of the TB.

(2) Each CB/CBG may have an independent field for explicitly indicating whether the corresponding CB/CBG needs to clear the corresponding buffer, or implicitly indicating to the corresponding CB/CBG whether it needs to clear the corresponding buffer by indicating whether the corresponding CB/CBG is destroyed. Alternatively, each TB uses 1 bit to indicate whether the corresponding CB/CBG scheduled by the same DCI needs to clear the corresponding buffer, or multiple TBs share the same one bit to indicate that whether the CB/CBG scheduled by the same DCI needs to clear the corresponding buffer. By toggling this field relative to the last transmission scheduling the same TB, it can indicate that the CB/CBG is a new CBG or a CBG that may need to clear the buffer, and the untoggled field may indicate that the CB/CBG is a CBG that does not need to clear the buffer.

However, when CBs contained in the current CBG and CBs contained in the CBG transmitted last time are different, the buffer is cleared. For example, CB1~4 in the buffer is the last transmitted CBG1, and the current transmission receives an instruction to clear the buffer of the CB of the CBG2. In this case, the CBG2 only includes CBs 3~4, and only the buffers of CBs 3~4 are cleared and the CBs 1~2 remain in the buffer. On the other hand, if CBs1~4 in the buffer are the last transmitted CBG1 and CBG2 and the current transmission receives an instruction to clear the buffers of the CBs of CBG1 and the CBG1 at this time contains CB1~4, the buffers of CBs1~4 need to be cleared.

In addition, in step S130, a DAI may be further included in the DCI including the CBG scheduling/configuration information generated by the base station. The DAI may include a first type of DAI and/or a second type of DAI.

The first type of DAI, also known as counter DAI, indicates one of the following:

(1) a sum of the number of CBGs scheduled in the HARQ-ACK feedback bundling window up to the currently scheduled DL time unit (e.g., DL time unit Ti) and the current carrier (e.g., the current carrier Ci), or a sum of the number of HARQ-ACK bits to be fed back;

(2) a sum of the number of CBGs scheduled in the HARQ-ACK feedback bundling window up to the currently scheduled DL time unit (e.g., DL time unit Ti) and/or the latest DL time unit and/or carrier before the current carrier (e.g., the current carrier Ci) plus one, or a sum of the number of HARQ-ACK bits to be fed back plus one;

(3) a sum of the maximum number of CBGs of the scheduled DL time unit and/or the DL carrier in the HARQ-ACK feedback bundling window up to the currently scheduled DL time unit (e.g., DL time unit Ti) and the current carrier (e.g., the current carrier Ci), or a sum of the number of HARQ-ACK bits to be fed back; or (4) a sum of the maximum number of CBGs of the scheduled DL time unit and/or the DL carrier in the HARQ-ACK feedback bundling window up to the currently scheduled DL time unit (e.g., DL time unit Ti) and/or the latest DL time unit and/or carrier before the current carrier (e.g., the current carrier Ci) plus one, or a sum of the number of HARQ-ACK bits to be fed back plus one.

The HARQ-ACK feedback bundling window is a set of all DL time units and/or a set of all carriers whose HARQ-ACK/NACKs may be fed back at the same time in the same uplink time unit. This disclosure does not limit the length of the DL time unit, which may be, for example, a DL slot, a mini-slot, or an OFDM symbol.

The first type of DAI counts in a granularity of the number of CBGs. If configured in a TB scheduling mode, one TB can be considered as corresponding to one CBG. When the carrier configured for the TB scheduling mode is scheduled and the base station does not configure the spatial dimension bundling, the number of CBGs scheduled for this carrier may be considered as a fixed value. For example, the number of CBGs scheduled for this carrier may be equal to the maximum number of TBs Nmax_TB=2 that can be supported in a MIMO mode. Alternatively, the number of CBGs scheduled for this carrier may be equal to the number of actually scheduled TBs.

For the above (3) or (4), the maximum number of CBGs Nmax_CBG of each scheduled DL time unit and/or the DL carrier may be different. For example, the base station configures different Nmax_CBG for different DL carriers. A special case is that a TB scheduling mode is configured for part of carriers. When the base station does not configure the bundling of the spatial dimension, Nmax_CBG=2 for these carriers. If one TB is scheduled, the HARQ-ACK bits of the other TB are dummy bits, while a CBG scheduling mode is configured for part of carriers, but the specific values of Nmax_CBG of each carrier configured with a CBG scheduling mode may be different. According to the method of the present invention, values of Nmax_CBG HARQ-ACKs are determined; or for a carrier configured with a TB scheduling mode, Nmax_CBG depends on the number of actually scheduled TBs; Nmax_CBG=1 if only one TB is Nmax_CBG=2 if two TBs are scheduled. The first type of DAI counts in the granularity of the number of CBGs, and the count of TB dimensions is included in the count of CBG dimensions. Therefore, no matter for the TB scheduling mode or the CBG scheduling mode, the first type of DAI calculates the number of HARQ-ACK bits that all the TBs in each PDSCH needs to feed, no matter one TB or two TBs are scheduled.

When the base station configures the bundling of the spatial dimension, Nmax_CBG=1 for the carrier for which a TB scheduling mode is configured. If two TBs are scheduled, the HARQ-ACKs of the two TBs are operated with an AND operation for a carrier for which a CBG scheduling mode is configured, if two TBs are scheduled, according to the method, a HARQ-ACK of Nmax_CBG bits is fed back regardless of whether one or two TBs are scheduled.

For example, it may be assumed that the time length of the HARQ-ACK feedback bundling window is one DL time unit and there are 3 carriers in the frequency domain dimension. All three carriers are configured to support scheduling of up to 2 TBs. In one DL time unit, the base station may schedule the PDSCH on two of the carriers, where carrier 1 may be configured in a CBG based scheduling manner and the maximum number of CBGs Nmax_CBG_C1=4 while carrier 2 may be configured in a TB based scheduling mode, and Nmax_CBG_C2=Nmax_TB=2. In addition, carrier 3 may be configured in a CBG based scheduling manner, and the maximum number of CBGs Nmax_CBG_C3=6. It is assumed that carrier 1 schedules 2 TBs, the total number of CBGs scheduled by the 2 TBs is 3; and carrier 1 schedules 1 TB, and the total number of scheduled CBGs is 6.

As shown in FIG. 5, according to the method of (1), the first type of DAI of carrier 1=3, which indicates that carrier 1 schedules three CBGs, and the first type of DAI of carrier 3=9, which indicates that carrier 1 to carrier 3 totally schedule 9 CBGs. When the UE receives the first type of DAI of carrier 3, it can find that the base station does not schedule carrier 2. According to the method of (4), the first type of DAI of carrier 1=9, which indicates that carrier 1 is the first scheduled carrier, and the first type of DAI of carrier 3=5, which indicates carrier 1 to carrier 2, and the total number of the maximum number of CBGs corresponding to each carrier scheduled by the base station is 4. When the UE receives the first type of DAI of carrier 3, it can find that the base station does not schedule carrier 2.

For example, it can be assumed that carrier 1 schedules 2 TBs, and the total number of CBGs scheduled by these 2 TBs is 3, carrier 2 schedules 1 TB and carrier 3 schedules 1 TB, and the total number of scheduled CBGs is 6. According to the method of (1), the first type of DAI of carrier 1=3, which indicates that carrier 1 schedules three CBGs; the first type of DAI of carrier 2=5, which indicates that a total of five CBGs are scheduled for carrier 1 to carrier 2; and the first type of DAI of carrier 3=11, which indicates that 11 CBGs are scheduled for carrier 1 to carrier 3 in total. Assuming that the UE fails to receive the PDCCH of carrier 2, but receives the PDCCHs of carrier 1 and carrier 3. Then, when receiving the first type of DAI of carrier 3, the UE may find that it missed the PDCCH of carrier 2 and determine that carrier 2 actually schedules up to two CBGs. What shall be noted is that the base station may schedule 1 TB or 2 TBs. However, no matter how many TBs are scheduled by the base station, it is considered that a maximum of 2 CBGs are scheduled.

According to the method of (4), as shown in FIG. 6, the first type of DAI of carrier 1=1, the first type of DAI of carrier 2=5, and the first type of DAI of carrier 3=7. Assuming that the UE fails to receive the PDCCH of carrier 2, but receives the PDCCHs of carrier 1 and carrier 3, when it receives the first type of DAI of carrier 3, the UE may find that it missed the PDCCH of carrier 2. Assuming that the UE fails to receive the PDCCH of carrier 1 and receives the PDCCHs of carrier 2 and carrier 3, the UE can find that it missed the PDCCH of carrier 1 when receiving the first type of DAI of carrier 2. In addition, the UE may determine that carrier 2 only schedules 1 TB according to the PDCCH of carrier 2, but the UE still needs to generate HARQ-ACKs of 2 TBs when generating the HARQ-ACK, where the HARQ-ACK of 1 TB is determined as an ACK/NACK according to the decoding result of the PDSCH, and the HARQ-ACK of the other TB is a dummy bit, which may be a fixed value, for example, the value may be a NACK/DTX. Alternatively, assuming that Nmax_CBG for a TB scheduled carrier is determined according to the number of scheduled TBs, then in this example, the first type of DAI of carrier 1=1, the first type of DAI of carrier 2=5, and the first type of DAI of carrier 3 is not 7, but 6. Assuming that the UE fails to receive the PDCCH of carrier 2, but receives the PDCCHs of carrier 1 and carrier 3, when generating the HARQ-ACK of carrier 2, the UE only needs to generate HARQ-ACK of 1 TB.

A first type of DAI may be used to calculate a start point of a bit position of ACK/NACK for the currently scheduled DL time unit (e.g., DL time unit Ti) and DL carrier (e.g., DL carrier Ci) in the HARQ-ACK codebook.

Corresponding to (2) or (4), the starting point of the bit position of ACK/NACK of the DL time unit Ti and the DL carrier Ci in the HARQ-ACK codebook may be equal to the corresponding DAI. The bit length of ACK/NACK of the DL time unit Ti and the DL carrier Ci may be the number of CBGs scheduled (corresponding to (2)) or the maximum number of CBGs (corresponding to (4)).

Corresponding to (1) or (3), the start point of the bit position of ACK/NACK of the DL time unit Ti and the DL carrier Ci in the HARQ-ACK codebook may be equal to the corresponding DAI minus the bit length of ACK/NACK of the DL time unit Ti and the DL carrier Ci plus 1. The bit length of ACK/NACK of the DL time unit Ti and the DL carrier Ci may be the number of CBGs scheduled (corresponding to (1)) or the maximum number of CBGs (corresponding to (3)).

When the UE feeds back the ACK/NACK of the DL time unit Ti and the DL carrier Ci, and the UE is configured in the CBG scheduling mode, the ACK/NACK of the CBG in the first scheduled TB is mapped first, the ACK/NACK of the CBG in the second scheduled TB (if 2 TBs are scheduled) is then mapped.

Corresponding to (1) or (2), when mapping ACKs/NACKs of respective CBGs in one TB, the ACK/NACK of each scheduled CBG is mapped in ascending order according to indexes of the CBGs actually scheduled by the TB.

Corresponding to (3) or (4), when mapping ACKs/NACKs of respective CBGs in one TB, the ACK/NACK of each CBG may be mapped in ascending order according to the indexes of the CBGs of the TB, where the ACK/NACK of the scheduled CBG is determined according to the decoding result of the CBG, and the ACK/NACK of the unscheduled CBG is a dummy bit for which a predefined value may be used. In addition, the total length of ACK/NACK bits for all TBs of the DL time unit Ti and the DL carrier Ci may be Nmax_CBG.

If it is configured in a TB scheduling mode, corresponding to (1)~(4), the ACK/NACK of the first TB may be mapped first, and then the ACK/NACK of the second TB may be mapped. The ACK/NACK of the scheduled TB is determined according to the decoding result of the TB. The ACK/NACK of the unscheduled TB is a dummy bit for which a predefined value may be used.

The second type of DAI, also called total DAI, may indicate a total number of bits of the HARQ-ACK codebook, or a total number of scheduled CBGs of all scheduled carriers from a first DL time unit among all scheduled DL time units to the current DL time unit in the HARQ-ACK feedback bundling window, or a total number of the maximum number of CBGs of all scheduled carriers from a first DL time unit among all scheduled DL time units to the current DL time unit in the HARQ-ACK feedback bundling window, or the sum of the number of corresponding HARQ-ACK bits to be fed back.

For example, in one DL time unit, the PDSCH is scheduled on 2 carriers, where carrier 1 is configured in a CBG-based scheduling mode with the maximum number of CBGs Nmax_CBG=4 and carrier 2 is configured in a TB-based scheduling mode. It is assumed that carrier 1 schedules 2 TBs and that the total number of CBGs scheduled by the 2 TBs is 3. If the second type of DAI represents a total number of scheduled CBGs of all scheduled carriers from a first DL time unit among all scheduled DL time units corresponding to a given uplink time unit to the current DL time unit, the second type of DAI of carrier 1 and carrier 2=3+2=5. If the second type of DAI represents a total number of the maximum number of CBGs of all scheduled carriers from a first DL time unit among all scheduled DL time units corresponding to a given uplink time unit to the current DL time unit, the second type of carrier 1 and carrier 2=4+2=6.

For a first type of DAI or a second type of DAI, there may be a case where a bit status corresponds to the value of multiple DAIs due to a limitation of the bit overhead. For example, in an LTE system, the DAI includes only 2 bits, but the actual value indicated by the DAI is 1 to 32 or more. In this case, a modulo form is usually adopted. For example, DAI="00" indicates that the value of DAI is 1, 5, 9, . . . , 4*(M−1)+1.

Another method for determining the total number of bits of the HARQ-ACK codebook may be not based on DAI. The size of the HARQ-ACK codebook and the bit arrangement order are determined based on the number of semi-statically configured carriers, the HARQ-ACK feedback bundling window, and the number of HARQ-ACK bits of the DL time unit Ti on the DL carrier Ci that is semi-statically configured. In this case, for the carrier configured for TB scheduling, the number of HARQ-ACK bits may be determined according to the maximum number of TBs that can be transmitted, e.g., 1 bit, if the DL carrier Ci is configured to have only one TB in maximum, and 2 bits, if the DL carrier Ci is configured to have only 2 TBs in maximum, no matter how many TBs are actually scheduled. For the carrier configured for CBG scheduling, it is fixed at Nmax_CBG_i regardless of the number of TBs.

The foregoing embodiments are mainly described from the perspective of a base station. For those skilled in the art, in order to ensure correct reception of the UE, the UE should follow the same or similar corresponding criterion and method as the base station to determine the received DCI, determine the CBG information therein, determine whether it is for one TB or multiple TBs, and determine each CBG indication in the DCI corresponds to which CBG of which CB, and determine how the received PDCCH is divided into CB, and how the received PDSCH is combined into CBG. Here, for the sake of brevity, these methods will not be repeated.

In addition, in order to ensure correct feedback of HARQ-ACK, the UE may also determine the information of the first type and/or the second type of DAI in the received DCI according to the same or corresponding criterion and method as the base station, and determine the HARQ-ACK feedback according to the information of the first type or the second type of DAI, or determine the HARQ-ACK feedback according to a predefined rule, e.g., the number of HARQ-ACK bits fed back in each scheduling is fixed as Nmax_CBG, and the repetitive details are not described herein for the same reasoning.

By using the foregoing embodiments, the length of the DCI in each scheduling may not be changed according to the number of scheduled TBs, which reduces the complexity of blindly detecting the PDCCH by the UE. In addition, when the UE performs HARQ-ACK feedback, the number of HARQ-ACK bits corresponding to the scheduled PDSCH does not change according to the number of scheduled TBs, which saves the HARQ-ACK feedback overhead. In addition, it avoids a scenario in which one or more of the PDSCHs (or PDCCHs) are missed by the UE when HARQ-ACK of PDSCHs of multiple carriers or HARQ-ACKs of PDSCHs of multiple DL time units are fed back in one uplink time unit, the size of the HARQ-ACK codebook or the arrangement order thereof cannot be determined due to the uncertainty in the number of TBs of the missed PDSCHs.

FIG. 2 is a flowchart illustrating a method 200 for feeding back HARQ-ACK/NACK in accordance with an embodiment.

Referring to FIG. 2, in step S210, the UE receives DL control signaling from the associated base station.

In step S220, the UE generates a HARQ-ACK codebook based on the DL control signaling and a decoding result for a DL transmission corresponding to the DL control signaling.

In step S230, the UE feeds back, to the base station, a HARQ-ACK corresponding to the DL transmission according to the generated HARQ-ACK codebook.

The UE may determine the size of the HARQ-ACK codebook, and the position of the ACK/NACK bits of the PDSCH scheduled by the DL control signaling in the HARQ-ACK codebook, according to the following first and/or second type of DAI included in the DL control signaling (note that the first type and/or the second type of DAI here may be different to the first and/or second types of DAI described above in connection with FIG. 1) and the selected reference TB.

If the carrier for which the current DL time unit is scheduled is configured in an operating mode to schedule at most one TB, e.g., a single antenna SIMO transmission mode, the reference TB may be the one scheduled TB, which corresponds to the DAI. In other words, this can also be understood as no need to determine the reference TB.

If the carrier for which the current DL time unit is scheduled is configured in an operating mode capable of scheduling more than one TB at most, and the carrier for which the current DL time unit is scheduled is configured to be in the TB scheduling mode, any one of the TBs may be selected as the reference TB. For example, the first TB can be selected as the reference TB, which corresponds to the DAI. In other words, this can also be understood as there being no need to determine the reference TB.

If the carrier for which the current DL time unit is scheduled is configured in an operating mode capable of scheduling more than one TB at most, and the carrier for which the current DL time unit is scheduled is configured to be in a CBG scheduling mode, which TB actually schedules the maximum number of CBGs is determined according to the DL control information, and the TB is determined as a reference TB, which corresponds to the DAI. If the number of actually-scheduled CBGs of multiple TBs are equal, any one of the multiple TBs may be selected to correspond to the DAI.

If the carrier for which the current DL time unit is scheduled is configured in an operating mode capable of scheduling more than one TB at most, the carrier for which the current DL time unit is scheduled is configured to be in a CBG scheduling mode, and the number of HARQ-ACK bits that can be fed back by each TB is the same, it is determined according to the configured maximum number of CBGs. For example, any one of the TBs may be selected as a reference TB, which corresponds to the DAI.

The number of ACK/NACK bits fed back by the UE for the PDSCH scheduled by the DL control signaling may be Nmax_TB*NCBG_ref, where Nmax_TB is the maximum number of TBs that can be scheduled in the PDSCH in the configured operating mode. Normally Nmax_TB can be 2. For carriers configured in a CBG scheduling mode, NCBG_ref may be the number of CBGs actually scheduled by the reference TB corresponding to the DAI. NCBG_ref may be 1 for carriers configured in a TB scheduling mode. For the carriers configured in the CBG scheduling mode, and the number of HARQ-ACK bits that each TB can feed back is equal to the configured maximum number of CBGs Nmax_CBG, NCBG_ref may be Nmax_CBG.

Alternatively, both the first type and/or the second type of DAI may use a fixed one TB as a reference, regardless of whether the scheduled carrier is configured to operate in the CBG or the TB scheduling mode. Further, the number of ACK/NACK bits fed back by the UE for the PDSCH scheduled by the DL control signaling may be Nmax_TB*Nmax_CBG_ref. For a carrier configured in a CBG scheduling mode, Nmax_CBG_ref may be the maximum number of CBGs that can be scheduled by the reference TB corresponding to the DAI. Nmax_CBG_ref may be 1 for carriers configured in a TB scheduling mode.

Different from the embodiment shown in FIG. 1, Nmax_CBG_ref or NCBG_ref in the embodiment shown in FIG. 2 is for one TB. If multiple TBs are scheduled in one PDSCH, e.g., if two TBs are scheduled, the sum of the maximum number of CBGs of the two TBs in one PDSCH is Nmax_CBG_ref*2.

Similarly, if two TBs are scheduled, the number of actually scheduled CBGs for two TBs in one PDSCH is NCBG_TB1+NCBG_TB2, where NCBG_ref=max (NCBG_TB1, NCBG_TB2).

For DCI scheduling this PDSCH, the indication of each CBG for each TB may be independent. For example, for 2 TBs, each TB has a bit indication for each CBG. For example, if Nmax_CBG=Nmax_CBG_ref=4, there is an 8-bit indication regardless of whether the base station actually schedules 1 or 2 TBs. When the base station only schedules one TB, the 4 bits of one TB that are not scheduled do not indicate the information of this TB, and can be used for other purposes, or are only dummy bits. For the DCI scheduling this PDSCH, the indication of each CBG of each TB may also be used in combination, which is not limited in the present disclosure.

In FIG. 2, the first type of DAI, which may also be referred to as a counter DAI, may indicate one of the following:

(1) the sum of the number of CBGs (NCBG_ref) actually scheduled by the reference TB of each scheduled DL time unit and/or the DL carrier in the HARQ-ACK feedback bundling window up to the currently scheduled DL time unit (e.g., the DL time unit Ti) and the current carrier (e.g., the current carrier Ci);

(2) the sum of the number of CBGs actually scheduled by the reference TB of each scheduled DL time unit and/or the DL carrier in the HARQ-ACK feedback bundling window up to the currently scheduled DL time unit (e.g., the DL time unit Ti) and/or the latest DL time unit and/or carrier before the current carrier (e.g., the current carrier Ci) plus one;

(3) the sum of the maximum number(Nmax_CBG_ref) of CBGs of the reference TB of the scheduled DL time unit and/or the DL carrier in the HARQ-ACK feedback bundling window up to the currently scheduled DL time unit (e.g., the DL time unit Ti) and the current carrier (e.g., the current carrier Ci); and (4) the sum of the maximum number of CBGs of the reference TB of the scheduled DL time unit and/or the DL carrier in the HARQ-ACK feedback bundling window up to the currently scheduled DL time unit (e.g., the DL time unit Ti) and/or the latest DL time unit and/or carrier before the current carrier (e.g., the current carrier Ci) plus one.

In FIG. 2, the second type of DAI may be used to indicate a total number of bits of the HARQ-ACK codebook; or a total number of scheduled CBGs of all scheduled carriers from a first DL time unit among all scheduled DL time units to the current DL time unit in the HARQ-ACK feedback bundling window; or a total number of the maximum number of CBGs of all scheduled carriers from a first DL time unit among all scheduled DL time units to the current DL time unit in the HARQ-ACK feedback bundling window.

The total number of bits of the HARQ-ACK codebook or the total number of scheduled CBGs or total number of the maximum number of CBGs may be equal to a product of the second type of DAI and Nmax_TB when the base station does not configure a bundling of the spatial dimension. In some embodiments, when the base station configures the bundling of the spatial dimension, the total number of bits of the HARQ-ACK codebook or the total number of scheduled CBGs or the total number of the maximum number of CBGs may be equal to the second type of DAI.

The first type of DAI may be used to calculate a start point of a bit position of ACK/NACK bits for the currently scheduled DL time unit in the HARQ-ACK codebook. For example, if Nmax_TB=2, corresponding to (2) or (4), when the base station does not configure a bundling of the spatial dimension, the start point of the bit position of the ACK/NACK bits for DL time unit Ti and DL carrier Ci in the HARQ-ACK codebook may be equal to the corresponding DAI multiplied by 2 and minus 1. Corresponding to (1), the start point of the bit position of the ACK/NACK bits of the DL time unit Ti and the DL carrier Ci in the HARQ-ACK codebook may be equal to the corresponding DAI minus NCBG_ref of the DL time unit Ti and the DL carrier Ci, then multiplied by 2 and plus 1. Corresponding to (3), the starting point of the bit position of the ACK/NACK bits of the DL time unit Ti and the DL carrier Ci in the HARQ-ACK codebook may be equal to the corresponding DAI minus Nmax_CBG_ref of the DL time unit Ti and the DL carrier Ci, then multiplied by 2 and plus 1.

In addition, corresponding to (2) or (4), the starting position of the bit position of the ACK/NACK bits of the DL time unit Ti and the DL carrier Ci in the HARQ-ACK codebook may be equal to the corresponding DAI when the base station configures the bundling of the spatial dimension. Corresponding to (1), the start point of the bit position of the ACK/NACK bits of the DL time unit Ti and the DL carrier Ci in the HARQ-ACK codebook may be equal to the corresponding DAI minus NCBG_ref of the DL time unit Ti and the DL carrier Ci and plus one. Corresponding to (3), the start point of the bit position of the ACK/NACK bits of the DL time unit Ti and the DL carrier Ci in the HARQ-ACK codebook may be equal to the corresponding DAI minus Nmax_CBG_ref of the DL time unit Ti and the DL carrier Ci and plus one.

If the base station does not configure the bundling of the spatial dimension, when the UE feeds back the ACK/NACK of the DL time unit Ti and the DL carrier Ci, the ACK/NACK of the CBG in the first TB may be mapped first and then the ACK/NACK of the CBG in the second TB are mapped.

Corresponding to (1) or (2), for each TB, the ACK/NACK bits of each scheduled CBG may be sequentially mapped in ascending order according to the indexes of the actually scheduled CBG. When the number of CBGs scheduled by two TBs are different, for a TB with a smaller number of CBGs, a dummy bit may be sent so that the number of ACK/NACK bits of the TBs is equal to NCBG_ref. For example, 2 TBs are scheduled, CBGs 1, 2, and 3 are scheduled by TBa, and CBGs 2 and 4 are scheduled by TBb. Then, NCBG_ref=3 and a 6-bit ACK/NACK is fed back. First, the ACK/NACKs of the three CBGs of TBa are mapped, the ACK NACK bits of the second and fourth CBGs of the TBb are then mapped, and finally the 1-bit dummy bit is mapped.

Corresponding to (3) or (4), when mapping ACK/NACKs of respective CBGs in one TB, the ACK/NACK bit of each CBG may be sequentially mapped in an ascending order according to an index of the CBG of the TB. The ACK/NACK of the scheduled CBG is determined according to the decoding result of the CBG. The ACK/NACK of the unscheduled CBG may be a dummy bit for which a predefined value may be used, so that the number of ACK/NACK bits of each TB is equal to Nmax_CBG_ref. Corresponding to (1)~(4), the ACK/NACK of unscheduled TBs may be a dummy bit for which a predefined value may be used.

In addition, if the base station configures the bundling of the spatial dimension, when the UE feeds back the ACK/NACK of the DL time unit Ti and the DL carrier Ci, if the TB scheduling mode is configured, the ACK/NACK bits of each scheduled TB may be logically ANDed. Alternatively, ACK/NACKs for non-scheduled TBs may be set as ACKs, and ACK/NACKs for each TBs may be logically ANDed. If the CBG scheduling mode is configured, the ACK/NACKs scheduled in each TB and having the same CBG index may be logically ANDed, i.e., the unscheduled CBGs do not participate in the logical AND operation. The number of ACK/NACK bits fed back by the UE for the PDSCH scheduled by the DL control signaling is Nmax_TB*Nmax_CBG_ref, where Nmax_TB=1. Correspondingly, in a more reasonable manner, when the configured CBG scheduling mode adopts the bundling of the spatial dimension and when two TBs are scheduled, the UE may consider that the bits in the DL scheduling signaling indicating whether the corresponding CB/CBG is scheduled are common to 2 TBs, i.e., there is only one set of bits indicating CB/CBG, and there is no independent CB/CBG scheduling indication for these 2 TBs.

The bundling of the spatial dimension can be configured by a signaling, which is applicable to both the TB scheduling mode and the CBG scheduling mode. Alternatively, the bundling of the spatial dimension may be configured independently by two signaling, or there is only one signaling for TB scheduling mode, for the CBG scheduling mode, it indicates by defaults that it requires bundling of spatial dimension.

Corresponding to (3) or (4), the ACK/NACKs scheduled in each TB and having the same CBG index may be logically ANDed, i.e., the unscheduled CBGs do not participate in the logical AND operation. For CBGs that are not scheduled in each TB, the ACK/NACK may be a dummy bit. For example, if 2 TBs are scheduled and Nmax_CBG=4, TBa schedules #1 and #3 CBGs and TBb schedules #1 and #2 CBGs. The UE generates a 4-bit ACK/NACK in total, corresponding to 4 CBGs, respectively. The first bit of ACK/NACK is the result of a logical AND operation of ACK/NACKs for TBa #1 CBG and TBb #1 CBG, the second bit of ACK/NACKs is the ACK/NACK for TBb #2 CBG, the third bit of ACK/NACKs is the ACK/NACK of TBa #3 CBG, and the fourth bit is a dummy bit. Alternatively, the ACK/NACKs of the unscheduled CBGs may be ACKs, and the ACK/NACKs of the CBGs with the same CBG index in each TB may be logically ANDed.

Corresponding to (1) or (2), for each TB, the virtual CBG index j can be obtained according to the indexes of the actual scheduled CBGs, in an ascending order. According to the virtual CBG index, the ACK/NACKs of the CBGs with the same CBG index in each TB are logically ANDed. Alternatively, the ACK/NACKs of the CBGs with the same CBG index and actually scheduled in each TB may be logically ANDed. If the CBG indexes actually scheduled by each TB are different, the indexes of the actually scheduled CBGs are sorted in an ascending order according to indexes of actually scheduled CBGs, to obtain a virtual CBG index j, and the ACK/NACKs of the CBGs with the same CBG index in each TB are logically ANDed according to the virtual CBG index.

For example, TBa schedules CBG #1, CBG #3, #4 and TBb schedules CBG #1, CBG #2, CBG #4 for 2 TBs. Then, a 3-bit ACK/NACK is fed back, where the first bit of the HARQ-ACK codebook may be a logical AND of the ACK/NACK of CBG #1 of TBa and the ACK/NACK of CBG #1 of TBb, and the second bit may be a logical AND of the ACK/NACK of CBG #4 of TBa and the ACK/NACK of CBG #4 of TBb, and the third bit may be a logical AND of the ACK/NACK of CBG #3 of TBa and the ACK/NACK of CBG #2 of TBb.

For example, assuming that the bundling of the spatial dimension is not configured, the time length of the HARQ-ACK feedback bundling window is one DL time unit, and the frequency domain dimension has 3 carriers. In one DL time unit, the base station may schedule the PDSCH on two of the carriers, where carrier 1 is configured in a CBG-based scheduling manner and the maximum number of CBGs Nmax_CBG_C1=4 while carrier 2 is configured in a TB-based scheduling Mode, and Nmax_CBG_C2=1. In addition, the carrier 3 is configured to be based on the CBG scheduling mode, and the maximum number of CBGs Nmax_CBG_C3=6. It is assumed that carrier 1 schedules 2 TBs, where TBa schedules 1 CBG (e.g., #3) and TBb schedules 2 CBGs (e.g., #1 and #2).

According to the method (1) or (2), the TB corresponding to the DAI may be TBb and NCBG_ref_C1=2. The TB corresponding to the DAI may be any one according to the method (3) or (4) (selecting TBb or TBa is completely equivalent since the maximum number of CBGs configured by the base station is the same for each TB), such as TBa, and Nmax_CBG_C1=4. Carrier 2 schedules 1 TBc. According to the methods (1)~(4), the TB corresponding to the DAI may be TBc, NCBG_ref_C2=1, and Nmax_CBG_C2=1.

According to the method (1), as shown in FIG. 7, the first type of DAI of carrier 1 may be 2, the first type of DAI of carrier 2 may be 3, and the second type of DAI of carrier 1 and carrier 2 may be 3. The size of the HARQ-ACK codebook fed back by the UE may be of 6 bits.

Carrier 1 occupies 4 bits, where TBa has 2 bits of ACK/NACK, and the first bit in the HARQ-ACK codebook is determined according to the detection result of the scheduled CBG. The second bit is a dummy bit. TBb has 2 bits of ACK/NACK, and bits 3 and 4 in the HARQ-ACK codebook are determined according to the detection result of the scheduled CBG.

Carrier 2 occupies 2 bits, TBc has 1 bit of ACK/NACK, the fifth bit in the HARQ-ACK codebook is determined according to the detection result of the scheduled TBc, and the 6th bit in HARQ-ACK codebook is a dummy bit.

According to the method (2), the first type of DAI of carrier 1 may be 1, the first type of DAI of carrier 2 may be 3, and the second type of DAI of carrier 1 and carrier 2 may be 3. The bitmap of ACK/NACK may be the same as the bitmap of ACK/NACK of (1).

According to the method (3), in the example of FIG. 7, if Nmax_CBG_C1 represents the maximum number of CBGs for one PDSCH or the number of bits of HARQ-ACKs fed back by one PDSCH, when 2 TBs are scheduled, it is assumed that each TB has four CBGs, an internal CBG dimension bundling is performed in each TB. As shown in FIG. 9, first and second CBGs of TBa are bundled, third and fourth CBGs of TBa are bundled, first and second CBG of TBb are bundled, third and fourth CBGs of TBb are bundled. TBb or TBa can be selected as the reference TB, then the first type of DAI for carrier 1 is 2. The first type of DAI of carrier 2 is 3, and the second type of DAI of carrier 1 and carrier 2 is 3. The size of the HARQ-ACK codebook fed back by the UE is of 6 bits. For the carriers in a TB scheduling mode and for the carries in a CBG scheduling mode that actually schedules 2 TBs, the counts of the first type of DAIs are the count of the reference TB, but for the carries in a CBG scheduling mode that actually schedules only 1 TB. The counts of DAIs are the number of CBGs for this TB divided by 2.

In another situation, as shown in FIG. 10, carrier 1 can schedule at most two TBs, and carrier 1 actually schedules only Tba, i.e., the third CBG. The HARQ-ACK fed back by the TB is of 4 bits. The third bit determines the HARQ-ACK according to the decoding result, and the other 3 bits can send the dummy bits. The first type of DAI of carrier 1=2, the second type of DAI of carrier 1=3. The first type of DAI of carrier 2 is 3 and the second type of DAI of carrier 2 is 3. An advantage is that it can effectively reduce the overhead of DAI. The size of the HARQ-ACK codebook is the second type of DAI*2. If Nmax_CBG_C1=4 represents the maximum number of CBGs for a TB, in the example of FIG. 7, the first type of DAI of carrier 1 may be 4, the first type of DAI of carrier 2 may be 5, the second type of DAI of carrier 1 and carrier 2 may be 5. The size of the HARQ-ACK codebook fed back by the UE is of 10 bits.

Carrier 1 occupies 8 bits and TBa has a 4-bit ACK/NACK. The third bit in the HARQ-ACK codebook determines the ACK/NACK value according to the detection result of the scheduled #3 CBG, and bits 1, 2, and 4 are dummy bits. TBb has a 4-bit ACK/NACK, bits 5 and 6 in the HARQ-ACK codebook determine ACK/NACK values based on the detection results of the scheduled #1 CBG and #2 CBG, and bits 7 and 8 are dummy bit. In some carrier 2 occupies 2 bits and TBc has a 1-bit ACK/NACK. The 9th bit in the HARQ-ACK codebook determines the ACK/NACK value according to the detection result of the scheduled TBc, and the 10th bit in the HARQ-ACK codebook is a dummy bit.

According to the method (4), as shown in FIG. 8, Nmax_CBG_C1=4 represents the maximum number of CBGs of one TB, the first type of DAI of carrier 1 may be 1, the first type of DAI of carrier 2 may be 5, and the second type of DAI of carrier 2 may be 5. The total number of bits of the HARQ-ACK/NACK codebook is 10.

For the first or second type of DAI, there may be a case where a bit status corresponds to the value of multiple DAIs due to a limitation of the bit overhead. For example, in an LTE system, the DAI may include only 2 bits, but the actual value indicated by the DAI may be 1 to 32 or more. In this case, a modulo form is usually adopted. For example, DAI="00" indicates that the value of DAI is 1, 5, 9, . . . , 4*(M−1)+1. For another example, the value of DAI may be determined by taking the greatest common divisor of the maximum number of HARQ-ACK bits that can be sent by each PDSCH as a step. It is assumed that Nmax_CBG may have values 2 and 4. Then the step is 2.

The second type of DAI="000" means that value of DAI is 2, . . . 16*(M−1)+2, DAI="001" means the value of DAI is 4 . . . 16*(M−1)+4, DAI="010" means the value of DAI is 6 . . . 16*(M−1)+6, DAI="110" means the value of DAI is 14 . . . 16*(M−1)+14, and DAI="111" means that value of DAI is 16 . . . 16*(M−1)+16.

The foregoing embodiment is mainly described from the UE side. However, it is not difficult see that in order to ensure correct and reception of HARQ-ACK, the base station should also determine the value of the first of DAI and/or the second type of DAI in transmitting the DCI according to the same or corresponding criterion and method as the UE, and the size of the HARQ-ACK codebook and the mapping of the ACK/NACK bits when the HARQ-ACK codebook is received.

If the base station configures at least one carrier for the UE in the CBG scheduling mode, the base station cannot configure HARQ-ACK spatial bundling for the carrier which is configured with CBG scheduling mode for the UE at the same time.

When the uplink control signaling including the HARQ-ACK exceeds the maximum number of bits that can be carried by the PUCCH format used, the UE may prioritize the HARQ-ACK bundling of the spatial dimension over the bundling of the CBG dimension bundling. Alternatively, the UE may preferentially perform bundling of the CBG dimension with respect to the bundling of the spatial dimension. The bundling of the CBG dimension generates a 1-bit HARQ-ACK after a logical AND operation on the HARQ-ACKs of multiple CBGs of one TB. The HARQ-ACK bundling of the spatial dimension is performed according to the method when the base station configures the HARQ-ACK bundling of the spatial dimension according to an embodiment of the disclosure.

The HARQ-ACK bundling of the CBG dimension may be implemented so that the number of HARQ-ACK bits of the carrier based on the CBG scheduling is a fixed value Nmax_harq without changing with the number of actually scheduled TBs. The fixed value may be configured by the base station or marked as predefined. For example, it can be implemented according to at least one of the following methods:

If Nmax_harq=Nmax_CBG, and Nmax_CBG is the total number of the maximum number of CBGs for all TBs scheduled at a time, the number of HARQ-ACK bits of each TB is Nmax_harq/Nmax_TB. The scheduled TB generates an ACK/NACK according to a decoding result, and the unscheduled TB sends Nmax_CBG_TBi dummy bits, where the predefined dummy bit may be a NACK or an ACK.

If Nmax_harq=Nmax_CBG, and Nmax_CBG is the maximum number of CBGs for one TB scheduled at a time, the sum of the number of HARQ-ACK bits corresponding to all TBs scheduled at a time may be Nmax_CBG according to the method described below. For example, when 2 TBs are scheduled, although the maximum number of CBGs that can be scheduled by each TB is Nmax_CBG=4, the number of HARQ-ACK bits of each TB is Nmax_CBG/2=2. In an implementation manner, HARQ-ACKs of multiple CBGs may be ANDed according to a predefined rule, i.e., HARQ-ACKs of multiple CBGs are bundled. For example, when two TBs are scheduled, assuming that the first TB schedules four CBGs and the second TB schedules three CBGs, the HARQ-ACKs of the first two CBGs of the first TB are ANDed to obtain a 1-bit HARQ-ACK and HARQ-ACKs of the last two CBGs are ANDed to obtain a 1-bit HARQ-ACK. The HARQ-ACKs of the first two CBGs of the second TB are ANDed to obtain a 1-bit HARQ-ACK and the HARQ-ACK of the third CBG of the second TB is 1 bit.

As another example, when two TBs are scheduled, it is assumed that the first TB schedules the second and third CBGs and the second TB schedules the third CBGs. Assuming that the DAI indicates that 3 CBGs are scheduled in total or indicates that it needs to feed 3 bits of HARQ-ACK back for the scheduling, no bundling is needed. As another example, when two TBs are scheduled, it is assumed that the first TB schedules four CBGs and the second TB schedules the third CBG. Assuming that the DAI indicates that there are three CBGs scheduled or indicates that it needs to feed 3 bits of HARQ-ACK back for the scheduling, the HARQ-ACKs of the first and second CBGs of the first TB are bundled, and the HARQ-ACKs of the third and fourth CBGs of the first TB are bundled, and the third CBG of the second TB generates a one-bit HARQ-ACK.

Preferably, CBGs of different TBs are not bundled.

Preferably, CBGs that are not scheduled do not participate in bundling. For example, when two TBs are scheduled, assuming that the first TB schedules the first, third and fourth CBGs and the second TB schedules the first CBG, then the second CBG of the first TB does not participate in bundling. The first CBG corresponds to a 1-bit HARQ-ACK, the third and fourth CBGs operate to obtain a 1-bit HARQ-ACK, and the first CBG of the second TB corresponds to a 1-bit HARQ-ACK and generates a 1-bit of dummy bit. The dummy bit is a predefined value, e.g., a value of NACK.

Preferably, CBGs that are not scheduled do not participate in bundling. An unscheduled CBG corresponds to an ACK if it is previously scheduled and correctly decoded, otherwise a NACK.

The bundling of CBG dimensions described above can be combined with the method of the first type of DAI/second type of DAI of the present invention.

As shown in FIG. 11, the DAI performs counting in a granularity of CBG and counts the number of CBGs for all TBs for each PDSCH. Assuming that carrier 1 schedules the total number of bits for the HARQ-ACK feedback Nmax_harq=4, the base station schedules 2 TBs, each TB may be divided into 4 CBGs, TBa schedules the third CBG, and TBb schedules the first and second CBG. Carrier 2 schedules TBc. The first type of DAI of carrier 1 is 1, the first type of DAI of carrier 2 is 5, the second type of DAI of carrier 1 and carrier 2 is 5, and the size of the HARQ-ACK codebook fed back by the UE is 5 bits. The carrier 1 occupies 4 bits, TBa and TBb occupy 2 bits, the first bit of TBa is a dummy bit, the second bit of TBa generates an ACK/NACK according to the detection result of CBG3, and the first bit of TBb is an AND operation result of the ACK/NACK as the detection result of CBG1 and CBG2, the second bit of TBb is a dummy bit. Carrier 2 occupies 1 bit, and TBc has a 1-bit ACK/NACK. The fifth bit in the HARQ-ACK codebook determines the ACK/NACK value according to the detection result of the scheduled TBc. In this example, although carrier 2 can schedule 2 TBs at maximum, the number of HARQ-ACK bits of carrier 2 is determined according to the number of actually scheduled TBs. If, according to another method, the HARQ-ACK code length configured for a carrier which is configured in a TB scheduling is 2, the size of the HARQ-ACK codebook in this example is 6 bits, of which the 6th bit is a dummy bit.

With the above-described methods, the HARQ-ACK codebook may be changed according to the number of scheduled carriers and the number of scheduled DL time units.

In another method of determining a HARQ-ACK codebook, the size of the HARQ-ACK codebook may be determined by the number of configured/activated DL carriers or DL time units that feed HARQ-ACKs back on a given uplink time unit/uplink carrier. In addition, it can also be determined by the maximum number of CBGs of these DL carriers/DL time units. That is, the three dimensions can be summed. The maximum number of CBGs for each DL carrier and/or DL time unit may be the same or different. If at least one DL carrier is configured to operate in a multi-TB operation mode and the base station does not configure a bundling for the spatial dimension, the size of the HARQ-ACK codebook may be based on summing the three dimensions and multiplying by the maximum number of TBs that can be scheduled. The maximum number of TBs that can be scheduled is the same for all DL carriers and/or DL time units. If the base station configures the bundling of the spatial dimension, the ACK/NACK with the same index of each CBG of each TB is logically ANDed.

In another method for determining the HARQ-ACK codebook, the size of the HARQ-ACK codebook may be determined according to the third type of DAI. The contents indicated by the third type of DAI are the same as the contents indicated by the second type of DAI, or the third type of DAI indicates the total number of bits of the HARQ-ACK/NACK codebook that the base station expects to receive, and the total number of bits of HARQ-ACK/NACK corresponding to the PDSCH actually scheduled by the base station is less than or equal to the expected total number of bits. When a HARQ-ACK is transmitted on the PUSCH, if the PUSCH needs to be rate-matched according to a HARQ-ACK codebook, the size of the HARQ-ACK codebook is indicated by the third type of DAI.

In the above method, how to determine which HARQ-ACK of the PDSCH of the DL time unit is fed back in an uplink time unit it is not limited. For example, it can be determined according to the prior art, determined according to the semi-statically configured uplink-DL configuration, or determined according to the HARQ-ACK feedback time indicated in the DL control signaling.

In addition, when the UE is configured to perform a CBG-based HARQ-ACK feedback, it may happen that the CRC checksum of each CBG in one TB is correct, but the CRC checksum of the TB fails. In order to at least partially solve or mitigate this problem, the UE may perform HARQ-ACK feedback in one of the following ways.

First HARQ-ACK Feedback

The UE may not only feed the HARQ-ACK of the CBG back, but may also feed the HARQ-ACK of the TB back. The ACK/NACK bits for this TB may be located at the beginning of the HARQ-ACK codebook or at the end of the HARQ-ACK codebook.

For example, when the UE is scheduled for 2 TBs, e.g., the bit order of the HARQ-ACK codebook is ACK/NACK bits of TB1, ACK/NACK bits of #1 CBG of TB1, ACK/NACK bits of #2 CBG of TB1, ACK/NACK bits of #Nmax_CBG CBG of TB1, ACK/NACK bits of TB2, ACK/NACK bits of #1 CBG of TB2, ACK/NACK bits of #Nmax_CBG CBG of TB2, where Nmax_CBG is the maximum number of CBGs of each TB.

Second HARQ-ACK Feedback

The UE may feed the HARQ-ACK of the CBG back and the bit length of the HARQ-ACK of the CBG fed back by the UE may be Nmax_CBG*Nmax_TB. If the spatial dimension bundling is adopted, the UE may feed the HARQ-ACK of the CBG back, and the bit length of the HARQ-ACK of the CBG fed back by the UE may be Nmax_CBG. For convenience, a single TB is described below.

Assuming that the current PDSCH transmission includes a complete TB, i.e., all CBGs of one TB are transmitted, if the UE correctly detects each of CBGs for a TB according to the correct CRC checksum for each CBG, but does not correctly detect the TB according to the incorrect CRC checksum for the TB, the UE may generate a NACK value for each of CBGs. In addition, if the UE correctly detects the TB according to the correct CRC checksum for the TB, the UE may generate a ACK value for each of CBGs.

If current DL transmission does not include all the CBGs of one TB and all CBGs of the TB are correctly detected by CRC checksums for each CBG up to the current scheduling time, but the TB is not correctly detected by a CRC checksum, the ACK/NACK is generated as at least one of the following: a NACK value for each of CBGs of the TB is generated; and a NACK value for each unscheduled CBGs in the current scheduling for which ACKs were previously fed back is generated; an ACK/NACK value opposite to a value of a predefined dummy bit for each of the unscheduled CBGs in the current scheduling for which ACKs were previously fed back is generated In addition, if the current scheduling only includes part of the TB, i.e., some of CBGs of one TB is scheduled and until now, the UE finds that all CBGs of the TB are correctly detected by CRC checksums for each CBG, but the TB is not correctly detected by a CRC checksum for the TB. The UE may determine the value of ACK/NACK according to at least one of the following three methods:

(1) Generating a NACK value for each of CBGs of the TB;

(2) Generating a NACK value for each of CBGs unscheduled in this current scheduling for which ACKs have been previously reported;

(3) Generating an ACK/NACK value opposite to a value of a predefined dummy bit for each of the unscheduled CBGs in the current scheduling for which ACKs were previously reported. For example, if the predefined dummy bit value is NACK, then an ACK is fed back in this case. However, if the predefined dummy bit value is ACK, a NACK is fed back in this case.

For example, the scheduled CBG may determine the ACK/NACK value according to the CRC checksum of the corresponding CBG, and the ACK/NACK value of the unscheduled, but correctly decoded CBG may be an ACK. In addition, when the UE finds that the CRC checksum of the TB is inconsistent with the CRC checksum of the CBG, the UE may set an ACK/NACK value of all CBGs of the TB as NACK.

For example, assume that the maximum number of CBGs that can be scheduled is 4. In the DL time unit T1, the base station schedules an initial transmission of a TB, which is divided into four CBGs. If the UE receives the TB, in which the CRC checksums of #1 CBG and #2 CBG fail and the CRC checksums of #3 CBG and #4 CBG are successful, the HARQ-ACK fed back by the UE may be NACK, NACK, ACK, and ACK. The base station schedules the retransmission of this TB in the DL time unit T2, scheduling #1 and #2 CBGs, and the UE receives the TB. If the CRC checksums of #1 and #2 CBGs are correct, but the CRC checksum of the TB fails, the HARQ-ACK fed back by the UE may be NACK, NACK, NACK, and NACK in this case.

In addition, if the current scheduling only includes part of the TB, i.e., some of CBGs of one TB is scheduled, and until now, the UE finds that all CBGs of the TB are correctly detected by CRC checksums for CBGs and the TB is also correctly detected by a CRC checksum for the TB, then the UE may determine the value of ACK/NACK according to one of the following two methods:

(1) Generate an ACK value for each CBG;

(2) Generate an ACK value for each CBGs scheduled in the current transmission, and ACK/NACKs of other CBGs are values of dummy bits.

When the number of CBGs actually divided in one TB is less than Nmax_CBG, the above method is only applicable to the HARQ-ACK bits corresponding to the number of actually divided CBGs, and does not limit HARQ-ACKs for other CBGs. For example, if the Nmax_CBG=4, the current TB can only be divided into two CBGs; when a CRC error occurs, 2 bits of HARQ-ACKs are set to NACKs, and the other 2 bits are not limited. Alternatively, the above method is applicable to Nmax_CBG HARQ-ACK bits. For example, Nmax_CBG=4, the current TB can only be divided into two CBGs, and when a CRC error of the TB occurs, 4 bits of HARQ-ACKs are all set to NACKs.

The UE checks the CRC of a TB if and only if the CRC for all CBGs of the TB is correct.

A method according to the foregoing embodiment may be used in combination with the embodiment illustrated in FIG. 1 and/or the embodiment illustrated in FIG. 2. For example, a determination of the HARQ-ACK of unscheduled CBGs according to the method illustrated in FIG. 2 may be combined with the embodiment illustrated in FIG. 1, and may also be used in combination with other technologies.

FIG. 12 illustrates a hardware arrangement of a network node and/or UE in accordance with an embodiment.

Referring to FIG. 12, the hardware arrangement 1200 includes a processor 1206. The processor 1206 may be a single processing unit or a plurality of processing units for performing different actions of the flow described herein. The arrangement 1200 also includes an input unit 1202 for receiving signals from other entities and an output unit 1204 for providing signals to other entities. The input unit 1202 and the output unit 1204 may be arranged as a single entity or as separate entities.

The arrangement 1200 includes at least one readable storage medium 1208 in the form of non-volatile or volatile memory such as electrically erasable programmable read only memory (EEPROM), flash memory, optical disk, Blu-ray disk and/or Hard disk drive. The readable storage medium 1208 includes a computer program 1210 that may include code/computer readable instructions that, when executed by the processor 1206 in the arrangement 1200, cause the hardware arrangement 1200 and/or a device comprising the hardware arrangement 1200 to perform the processes described above in connection with FIG. 1 and/or FIG. 2, and any variations thereof, for example.

Computer program 1210 is configured as computer program code having computer program modules 1210A-1210C architecture. Thus, in an embodiment using the hardware arrangement 1200 as a base station, the code in the computer program of arrangement 1200 may include a module 1210A for determining, based on a number of TBs that can be scheduled in a DL transmission to be transmitted and a maximum number of CBGs dividable in the DL transmission, a maximum number of CBGs dividable in each TB of the DL transmission. The code in the computer program may further include a module 1210B to determine a CBG configuration of CBGs scheduled in a corresponding TB based on a maximum number of CBGs dividable in each TB of the DL transmission. The code in the computer program may further include a module 1210C for transmitting DL control signaling indicating the CBG configuration. However, other modules for performing the various steps of the various methods described herein may also be included in the computer program 1210.

In addition, when the hardware arrangement 1200 is used as a UE, the code in the computer program of arrangement 1200 may include a module 1210A for receiving DL control signaling. The code in the computer program may further include a module 1210B for generating a HARQ-ACK codebook according to the DL control signaling, a reference TB in a DL transmission corresponding to the DL control signaling, and a decoding result for the DL transmission. The code in the computer program may further include a module 1210C for feeding back a HARQ-ACK corresponding to the DL transmission according to the generated HARQ-ACK codebook. However, other modules for performing the various steps of the various methods described herein may also be included in the computer program 1210.

The computer program modules may essentially perform various actions in the flow illustrated in FIG. 1 and/or FIG. 2 to simulate various devices. In other words, when executing different computer program modules in the processor 1206, they may correspond to various different units of the various devices mentioned herein.

Although the code in the embodiments disclosed above in connection with FIG. 12 are implemented as computer program modules that when executed in the processor 1206 cause the hardware arrangement 1200 to perform the actions described above in connection with FIG. 1 and/or FIG. 2, at least one of the codes may be at least partially implemented as a hardware circuit.

The processor may be a single central processing unit (CPU), but may also include two or more processing units. For example, the processor may include a general purpose microprocessor, an instruction set processor and/or related chipsets and/or a special purpose microprocessor (e.g., an application specific integrated circuit (ASIC)). The processor may also include an on-board memory for caching purposes. The computer program may be carried by a computer program product connected to the processor. The computer program product may include a computer readable medium having a computer program stored thereon. For example, the computer program product may be a flash memory, a random access memory (RAM), a read only memory (ROM), an EEPROM, and in alternative embodiments may be distributed to different computers in the form of memory within the UE program product.

FIG. 13 illustrates a hardware arrangement of a node and/or UE in accordance with an embodiment.

Referring to the FIG. 13, the hardware arrangement 1300 includes a processor 1310, a transceiver 1320, and a memory 1330. However, not all of the illustrated components are essential. Accordingly, the hardware arrangement 1300 may be implemented by more or less components than those illustrated in FIG. 13. In addition, the processor 1310 and the transceiver 1320 and the memory 1330 may be implemented as a single chip.

The processor 1310 may include one or more processors or other processing devices that control the function, process, and/or method. Operation of the network node and/or UE in accordance with the embodiment of the disclosure may be implemented by the processor 1310.

When the hardware arrangement 1300 performs operation of the network node, the processor 1310 may determine, based on a number of TBs that can be scheduled in a DL transmission to be transmitted and a maximum number of CBGs dividable in the DL transmission, a maximum number of CBGs dividable in each TB of the DL transmission. The processor 1310 may determine a CBG configuration of CBGs scheduled in a corresponding TB based on a maximum number of CBGs dividable in each TB of the DL transmission. The processor 1310 may control the transceiver 1320 to transmit DL control signaling indicating the CBG configuration.

When the hardware arrangement 1300 performs operation of the UE, the processor 1310 may control the transceiver 1320 to receive DL control signaling. The processor 1310 may generate a HARQ-ACK codebook according to the DL control signaling, a reference TB in a DL transmission corresponding to the DL control signaling, and a decoding result for the DL transmission. The processor 1310 may control the transceiver 1320 to transmit a HARQ-ACK corresponding to the DL transmission according to the generated HARQ-ACK codebook.

The transceiver 1320 may include a radio frequency (RF) transmitter for up-converting and amplifying a transmitted signal, and an RF receiver for down-converting a frequency of a received signal. Alternatively, the transceiver 1320 may be implemented by more or less components than those illustrated in components.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the hardware arrangement 1300. The memory 1330 may be connected to the processor 1310 and store at least one instruction or a protocol or a parameter for the function, process, and/or method. The memory 1330 may include ROM and/or RAM and/or hard disk and/or compact disc (CD)-ROM and/or digital video disc (DVD) and/or other storage devices.

The functions described herein as being implemented by pure hardware, pure software, and/or firmware may also be implemented by using dedicated hardware, a combination of general hardware and software, etc. For example, functionality described as being implemented through dedicated hardware (e.g., field programmable gate arrays (FPGAs), ASICs, etc.) may be implemented by general purpose hardware such as a CPU, digital signal processing (DSP)) unit, and software, and vice versa.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

The invention claimed is:

1. A method performed at a user equipment (UE) for transmitting and receiving a signal, the method comprising:

receiving code block groups (CBGs) included in a transport block (TB) on a physical downlink shared channel (PDSCH);

generating negative acknowledgement (NACK) bits for the CBGs included in the TB, in case that the CBGs are correctly detected, while the TB is not correctly detected; and transmitting the generated NACK bits, wherein in case that a number of the CBGs, $N_{CBG}$, included in the TB is less than a configured maximum number, $N_{max\_CBG}$, for the CBGs, at least one NACK bit is further generated, and wherein a number of the at least one NACK bit further generated is equal to a difference between the $N_{max\_CBG}$ and the $N_{CBG}$.

2. The method of claim 1, further comprising, for a retransmitted TB, in case a CBG of the retransmitted TB is correctly decoded in a previous transmission, generating an ACK value for the CBG of the retransmitted TB.

3. The method of claim 1, wherein the maximum number $N_{max\_CBG}$, for the CBGs is configured by a high-layer signaling.

4. The method of claim 1, wherein a HARQ-ACK spatial bundling is not applicable in case that a CBG-based PDSCH reception is configured.

5. A method performed at a base station for transmitting and receiving a signal, the method comprising:

transmitting code block groups (CBGs) included in a transport block (TB) on a physical downlink shared channel (PDSCH), to a user equipment (UE); and receiving negative acknowledgement (NACK) bits for the CBGs included in the TB, in case that the CBGs are correctly detected, while the TB is not correctly detected, wherein in case that a number of the CBGs, $N_{CBG}$, included in the TB is less than a configured maximum number, $N_{max\_CBG}$, for the CBGs, at least one NACK bit is further generated, and wherein a number of the at least one NACK bit further generated is equal to a difference between the $N_{max\_CBG}$ and the $N_{CBG}$.

6. The method of claim 5, wherein the maximum number, $N_{max\_CBG}$, for the CBGs is configured by a higher-layer signaling.

7. The method of claim 5, wherein, for a retransmitted TB, in case a CBG of the retransmitted TB is correctly decoded at the UE in a previous transmission, an ACK value for the CBG of the retransmitted TB is generated.

8. The method of claim 5, wherein a HARQ-ACK spatial bundling is not applicable in case that a CBG-based PDSCH reception is configured.

9. A user equipment (UE) for transmitting and receiving signal, the UE comprising:

a transceiver; and a processor configured to:

receive, via the transceiver, code block groups (CBGs) included in a transport block (TB) on a Physical downlink shared channel (PDSCH), generate negative acknowledgement (NACK) bits for the CBGs included in the TB, in case that the CBGs are correctly detected, while the TB is not correctly detected, and transmit, via the transceiver, the generated NACK bits, wherein in case that a number of the CBGs, $N_{CBG}$, included in the TB is less than a configured maximum number, $N_{max\_CBG}$, for the CBGs, at least one NACK bit is further generated, and wherein a number of the at least one NACK bit further generated is equal to a difference between the $N_{max\_CBG}$ and the $N_{CBG}$.

10. The UE of claim 9, wherein the maximum number, $N_{max\_CBG}$, for the CBGs is configured by a high-layer signaling.

11. The UE of claim 9, wherein the processor is configured to, for a retransmitted TB, in case a CBG of the retransmitted TB is correctly decoded in a previous transmission, generate an ACK value for the CBG of the retransmitted TB.

12. The UE of claim 9, wherein a HARQ-ACK spatial bundling is not applicable in case that a CBG-based PDSCH reception is configured.

13. A base station for transmitting and receiving signal, the base station comprising:

a transceiver; and a processor configured to:

transmit, via the transceiver, code block groups (CBGs) included in a transport block (TB) on a Physical downlink shared channel (PDSCH) to a user equipment (UE), and receive, via the transceiver, negative acknowledgement (NACK) bits for the CBGs included in the TB, in case that the CBGs are correctly detected, while the TB is not correctly detected, wherein in case that a number of the CBGs, $N_{CBG}$, included in the TB is less than a configured maximum number, $N_{max\_CBG}$, for the CBGs, at least one NACK bit is further generated, and wherein a number of the at least one NACK bit further generated is equal to a difference between the $N_{max\_CBG}$ and the $N_{CBG}$.

14. The base station of claim 13, wherein the maximum number, Nmax_CBG, for the CBGs is configured by a higher-layer signaling.

15. The base station of claim 13, wherein, for a retransmitted TB, in case a CBG of the retransmitted TB is correctly decoded at the UE in a previous transmission, an ACK value for the CBG of the retransmitted TB is generated.

16. The base station of claim 13, wherein a HARQ-ACK spatial bundling is not applicable in case that a CBG-based PDSCH reception is configured.

* * * * *